United States Patent
Sudret et al.

(10) Patent No.: US 12,206,996 B2
(45) Date of Patent: Jan. 21, 2025

(54) TONE MAPPING FOR IMAGE CAPTURE

(71) Applicant: GoPro, Inc., San Mateo, CA (US)

(72) Inventors: Violaine Marie Mong-Ian Sudret, Paris (FR); Téo Marcin, Colombes (FR)

(73) Assignee: GoPro, Inc., San Mateo, CA (US)

( * ) Notice: Subject to any disclaimer, the term of this patent is extended or adjusted under 35 U.S.C. 154(b) by 132 days.

(21) Appl. No.: 17/890,676

(22) Filed: Aug. 18, 2022

(65) Prior Publication Data
US 2023/0069500 A1    Mar. 2, 2023

Related U.S. Application Data

(60) Provisional application No. 63/398,716, filed on Aug. 17, 2022, provisional application No. 63/234,861, filed on Aug. 19, 2021.

(51) Int. Cl.
*H04N 23/741* (2023.01)
*H04N 23/71* (2023.01)
*H04N 23/76* (2023.01)

(52) U.S. Cl.
CPC .......... *H04N 23/741* (2023.01); *H04N 23/71* (2023.01); *H04N 23/76* (2023.01)

(58) Field of Classification Search
CPC ....... H04N 23/741; H04N 23/71; H04N 23/76
See application file for complete search history.

(56) References Cited

U.S. PATENT DOCUMENTS

| | | |
|---|---|---|
| 10,970,827 B2 | 4/2021 | Iijima |
| 2009/0324074 A1 | 12/2009 | Dembo |
| 2010/0020205 A1 | 1/2010 | Ishida |
| (Continued) | | |

FOREIGN PATENT DOCUMENTS

| | | | | |
|---|---|---|---|---|
| WO | WO2019104047 | * | 5/2019 | ............. G06T 5/009 |

OTHER PUBLICATIONS

Tae-Hyoung Lee, Wang-Jun Kyung, Cheol-Hee Lee, Hee-Chan Park and Yeong-Ho Ha, "Auto gain control based on look up table from sceneAluminance curve in mobile phone camera," 2009 17th European Signal Processing Conference, Glasgow, UK, 2009, pp. 273-277. (Year: 2009).

*Primary Examiner* — Twyler L Haskins
*Assistant Examiner* — Angel L Garces-Rivera
(74) *Attorney, Agent, or Firm* — Young Basile Hanlon & MacFarlane, P.C.

(57) ABSTRACT

Tone mapping for image capture may include accessing a first image detected using an image sensor; accessing an exposure parameter (exposure duration, or time, multiplied by ISO or gain) used to detect the first image; scaling pixel values of the first image by a scale factor inversely proportional to the exposure parameter to obtain a scaled image; determining a scene luminance based on an average of pixel values of the scaled image; determining a target luminance based on the scene luminance; determining a target histogram based on the target luminance; determining a first histogram of luminance values of the first image; determining a transfer function based on the first histogram and the target histogram; applying the transfer function to pixel values of the first image to produce a tone mapped image; and storing or transmitting an output image based on the tone mapped image.

20 Claims, 10 Drawing Sheets

(56) References Cited

U.S. PATENT DOCUMENTS

| | | |
|---|---|---|
| 2010/0201887 A1 | 8/2010 | Bakhmutsky |
| 2013/0342738 A1 | 12/2013 | Vranceanu |
| 2016/0037046 A1 | 2/2016 | Nashizawa |
| 2019/0108626 A1* | 4/2019 | Nashizawa ............ H04N 23/10 |
| 2020/0177786 A1 | 6/2020 | Guerin |
| 2021/0014466 A1 | 1/2021 | Kamiya |
| 2022/0166962 A1 | 5/2022 | Endo |
| 2022/0284553 A1* | 9/2022 | Hwang ................... G06T 5/00 |

* cited by examiner

TONE MAPPING FOR IMAGE CAPTURE

CROSS-REFERENCE TO RELATED APPLICATION(S)

This application claims priority to and the benefit of U.S. Provisional Application Patent Ser. No. 63/398,716, filed Aug. 17, 2022, and U.S. Provisional Application Patent Ser. No. 63/234,861, filed Aug. 19, 2021, the entire disclosures of which are hereby incorporated by reference.

TECHNICAL FIELD

This disclosure relates to tone mapping for image capture.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images (e.g., still images or video frames) may include spatially adjacent or overlapping content. Accordingly, systems, methods, and apparatus for capturing, processing, and/or encoding images, video, or both may be advantageous.

SUMMARY

Disclosed herein are implementations of tone mapping for image capture.

In a first aspect, the subject matter described in this specification can be embodied in systems that include an image sensor configured to detect images and a processing apparatus that is configured to access a first image detected using the image sensor; access an exposure parameter (exposure duration, or time, multiplied by ISO or gain) used to detect the first image; scale pixel values of the first image by a scale factor inversely proportional to the exposure parameter (exposure duration, or time, multiplied by ISO or gain) to obtain a scaled image; determine a scene luminance based on an average of pixel values of the scaled image; determine a target luminance based on the scene luminance; determine a target histogram based on the target luminance; determine a first histogram of luminance values of the first image; determine a transfer function based on the first histogram and the target histogram; and apply the transfer function to pixel values of the first image to produce a tone mapped image.

In a second aspect, the subject matter described in this specification can be embodied in methods that include accessing a first image detected using an image sensor; accessing an exposure parameter used to detect the first image; scaling pixel values of the first image by a scale factor inversely proportional to the exposure parameter to obtain a scaled image; determining a scene luminance based on an average of pixel values of the scaled image; determining a target luminance based on the scene luminance; determining a target histogram based on the target luminance; determining a first histogram of luminance values of the first image; determining a transfer function based on the first histogram and the target histogram; applying the transfer function to pixel values of the first image to produce a tone mapped image; and storing or transmitting an output image based on the tone mapped image.

In a third aspect, the subject matter described in this specification can be embodied in a non-transitory computer-readable storage medium. The non-transitory computer-readable storage medium may include executable instructions that, when executed by a processor, cause performance of operations, including accessing a first image detected using an image sensor; accessing an exposure parameter used to detect the first image; scaling pixel values of the first image by a scale factor inversely proportional to the exposure parameter to obtain a scaled image; determining a scene luminance based on an average of pixel values of the scaled image; determining a target luminance based on the scene luminance; determining a target histogram based on the target luminance; determining a first histogram of luminance values of the first image; determining a transfer function based on the first histogram and the target histogram; applying the transfer function to pixel values of the first image to produce a tone mapped image; and storing or transmitting an output image based on the tone mapped image.

In a fourth aspect, the subject matter described in this specification can be embodied in systems that include an image sensor configured to detect images and a processing apparatus that is configured to access a first image detected using the image sensor; access an exposure parameter used to detect the first image; scale pixel values of the first image by a scale factor inversely proportional to the exposure parameter to obtain a scaled image; determine a scene luminance based on an average of pixel values of the scaled image; determine a target luminance based on the scene luminance; access an unregularized transfer function; determine an average luminance for an image determined by applying the unregularized transfer function to the first image; compare the average luminance to the target luminance; determine differences between adjacent values of the unregularized transfer function; compare the differences to a threshold; responsive to a difference between a lower value and a higher value adjacent to the lower value exceeding the threshold, select among the lower value and the higher value based on the comparison of the average luminance to the target luminance; adjust the selected value of the unregularized transfer function to obtain a transfer function with differences between adjacent values that are less than the threshold; and apply the transfer function to pixel values of the first image to produce a tone mapped image.

In a fifth aspect, the subject matter described in this specification can be embodied in methods that include accessing a first image detected using an image sensor; accessing an exposure parameter used to detect the first image; scaling pixel values of the first image by a scale factor inversely proportional to the exposure parameter to obtain a scaled image; determining a scene luminance based on an average of pixel values of the scaled image; determining a target luminance based on the scene luminance; accessing an unregularized transfer function; determining an average luminance for an image determined by applying the unregularized transfer function to the first image; comparing the average luminance to the target luminance; determine differences between adjacent values of the unregularized transfer function; compare the differences to a threshold; responsive to a difference between a lower value and a higher value adjacent to the lower value exceeding the threshold, selecting among the lower value and the higher value based on the comparison of the average luminance to the target luminance; adjusting the selected value of the unregularized transfer function to obtain a transfer function with differences between adjacent, values that are less than the threshold; applying the transfer function to pixel values of the first image to produce a tone mapped image; and storing or transmitting an output image based on the tone mapped image.

In a sixth aspect, the subject matter described in this specification can be embodied in a non-transitory computer-readable storage medium. The non-transitory computer-readable storage medium may include executable instructions that, when executed by a processor, cause performance of operations, including accessing a first image detected using an image sensor; accessing an exposure parameter used to detect the first image; scaling pixel values of the first image by a scale factor inversely proportional to the exposure parameter to obtain a scaled image; determining a scene luminance based on an average of pixel values of the scaled image; determining a target luminance based on the scene luminance; accessing an unregularized transfer function; determining an average luminance for an image determined by applying the unregularized transfer function to the first image; comparing the average luminance to the target luminance; determine differences between adjacent values of the unregularized transfer function; compare the differences to a threshold; responsive to a difference between a lower value and a higher value adjacent to the lower value exceeding the threshold, selecting among the lower value and the higher value based on the comparison of the average luminance to the target luminance; adjusting the selected value of the unregularized transfer function to obtain a transfer function with differences between adjacent values that are less than the threshold; applying the transfer function to pixel values of the first image to produce a tone mapped image; and storing or transmitting an output image based on the tone mapped image.

BRIEF DESCRIPTION OF THE DRAWINGS

The disclosure is best understood from the following detailed description when read in conjunction with the accompanying drawings. It is emphasized that, according to common practice, the various features of the drawings are not tip-scale. On the contrary, the dimensions of the various features are arbitrarily expanded or reduced for clarity.

DETAILED DESCRIPTION

Figure 1A:
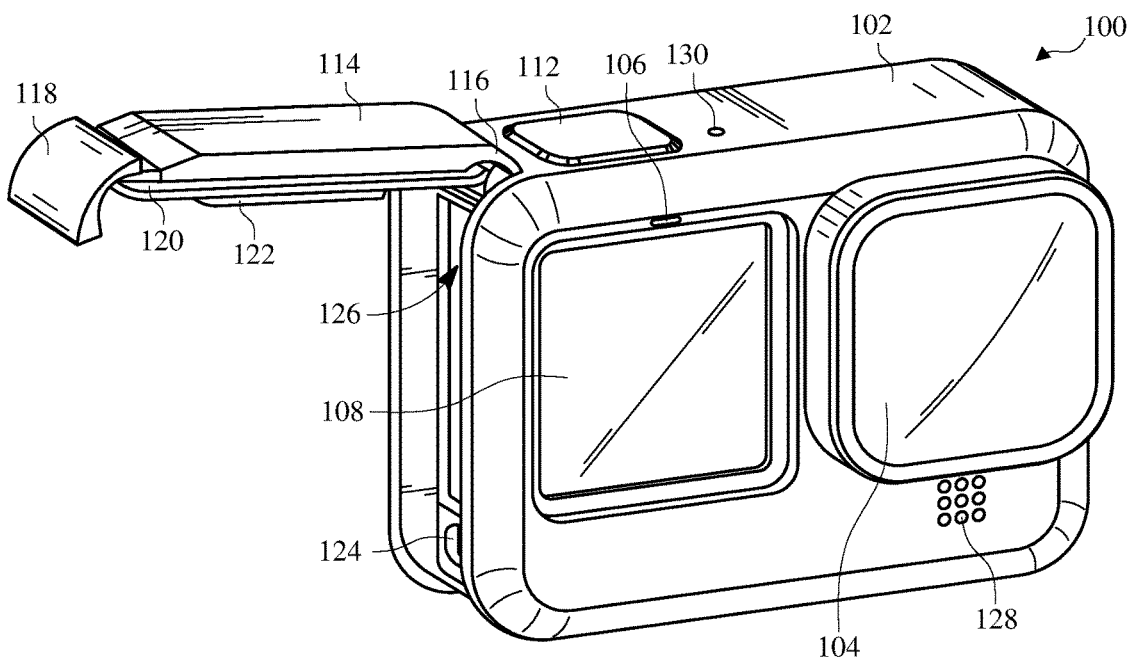
FIGS. 1A-B are isometric views of an example of an image capture apparatus.

This document includes disclosure of systems, apparatus, and methods for tone mapping for image capture. Tone mapping can have a significant impact on perceived image quality by enhancing contrast and more effectively utilizing the dynamic range for pixel values in an image. Tone mapping can also introduce distortions and high-frequency noise that can degrade image quality. Techniques described herein may adapt the tone mapping to lighting conditions of a scene to achieve higher image quality, while preventing the tone mapping from distorting particularly sensitive portions of an image, such as extreme black and white portions or highly uniform portions of the image. For example, the scene lighting conditions may be determined by an autoexposure module and this information may be utilized by a global tone mapping module to determine and/or regularize the derivative of a transfer function implementing the tone mapping.

Black and white protection may be employed to prevent the tone mapping from distorting portions of the image in extreme portions of the dynamic range of pixel values. On the darkest luminances (e.g., 2% or 1/64th of the dynamic range), gains may be restrained between two thresholds. On the highest or brightest luminances (e.g., 2% or 1/64th of the dynamic range), gains may be restrained to be identity. This restraint may prevent a global tone mapping from desaturating these brightest areas of an image (like the sun) or loosing contrast in the darkest ones.

Local regularization of a transfer function implementing a tone mapping may be used instead of global regularization. The regularization aims to constrain a derivative of the transfer function (e.g., a gain curve) between two thresholds. But, changing the derivative on a luminance bin, may modify the derivative on another bin in order to conserve the same last point of the gain curve. So, the regularization may include clipping a derivative between two thresholds and modifying the curve to match last point. In some implementations, regularization may be performed only on the part of the derivative that outreach the thresholds. The derivative may be constrained to fall within one or more thresholds, by locally modifying the derivative bins adjacent to the extrema.

Local regularization may be guided by a luminance target determined based on scene lighting information. When choosing which of two adjacent bins to modify (i.e., the lowest or the highest), the algorithm may choose the one that modifies the final luminance of image in the direction to conserve the luminance target (e.g., a luminance target from an autoexposure module).

A target histogram used to determine the transfer function of the tone mapping may be changed. The target histogram may be determined based on a gaussian centered on luminance target given by an autoexposure module, and the standard deviation may be chosen with a tuning process.

A region of uniformity in an image may be identified and preserved in some implementations of a global tone mapping. In global tone mapping, a function may be used to determine a uniformity score from thumbnail version of an image. If this score is higher than a given threshold, the image may be considered as uniform, and global tone mapping curve may be set to identity. To avoid restraining a global tone mapping curve on the whole dynamic range when only one part of image is uniform, the luminances corresponding to a uniform area may be identified (e.g., by analyzing a histogram of the luminance values of the image), A global tone mapping curve may have a slope set to one (1) on luminance bins corresponding to the uniformity in the image.

For example, an autoexposure algorithm may take as inputs: a low-resolution thumbnail version of an image and shooting parameters (e.g., exposure time or exposure duration, analog+digital gain) used to detect the image. For example, autoexposure algorithm may be implemented as:

```
sceneThumbnail = thumbnail / (exposure_ duration * analog_gain * digital_gain)
if mean(sceneThumbnail) < lowThreshold :
    scene is dark -> dark targetLuminance
if mean(sceneThumbnail) > highThreshold :
    scene is bright -> bright targetLuminance
targetLuminance -> Shooting parameters
meanLuminance,
``` where meanLuminance provides an indication of lighting conditions of the scene.

For example, a global tone mapping algorithm may take as inputs: a histogram of luminance values of an image, targetLuminance from the autoexposure module, and a low-resolution thumbnail version of the image. In some implementations, a transfer function matching the input histogram with the target histogram may be determined as follows:

```
targetHistogram = gaussian(targetLuminance)
uniformityScore, uniformityLuminance = uniformity(thumbnail, histogram)
if uniformityScore > highThreshold:
    then global tone mapping may have a slope set to one (1) luminances near uniformityLuminance,
``` where the uniformityScore (e.g., based on a standard deviation of luminance values occurring in an image) may reflect a level of uniformity present in the image, and uniformityLuminance identifies a range of pixel luminance values that correspond to the regions of high uniformity in the image.

Image capture devices implementing these techniques for tone mapping may have advantages, such as, for example, achieving higher image quality in varying lighting conditions than conventional tone mapping schemes. For example, contrast may be selectively enhanced by the tone mapping in a manner tailored to the lighting conditions of the scene, while preserving portions of the image that are sensitive to image quality degradation from tone mapping.

Figure 1B:
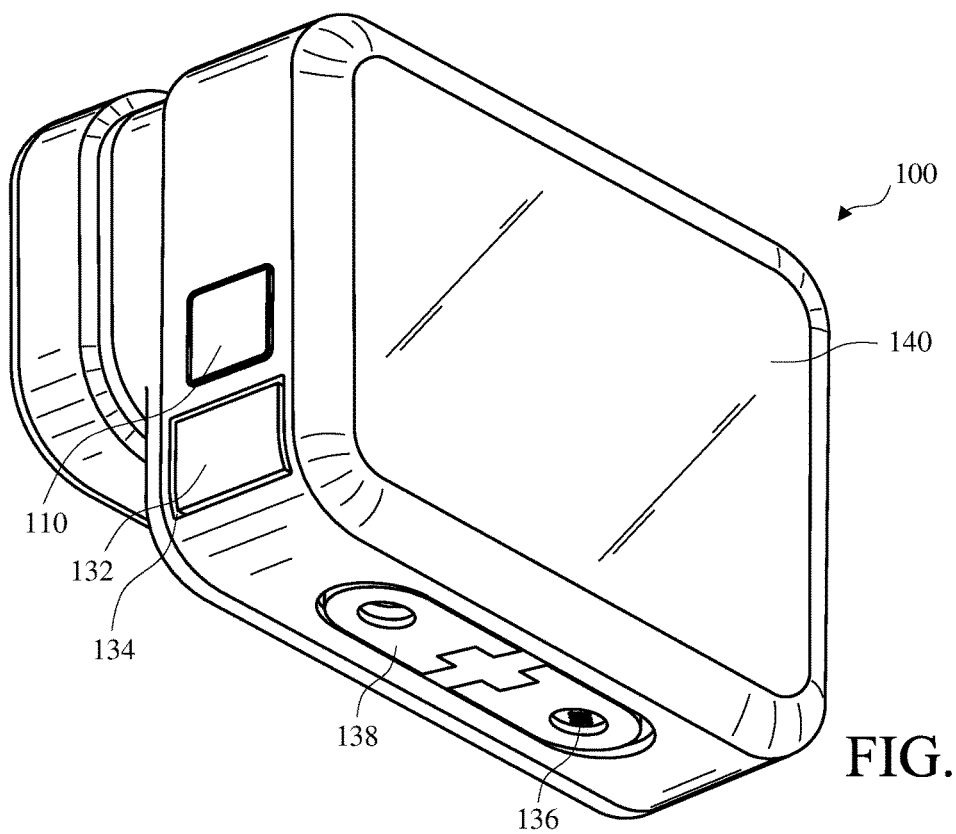
Figure 3:
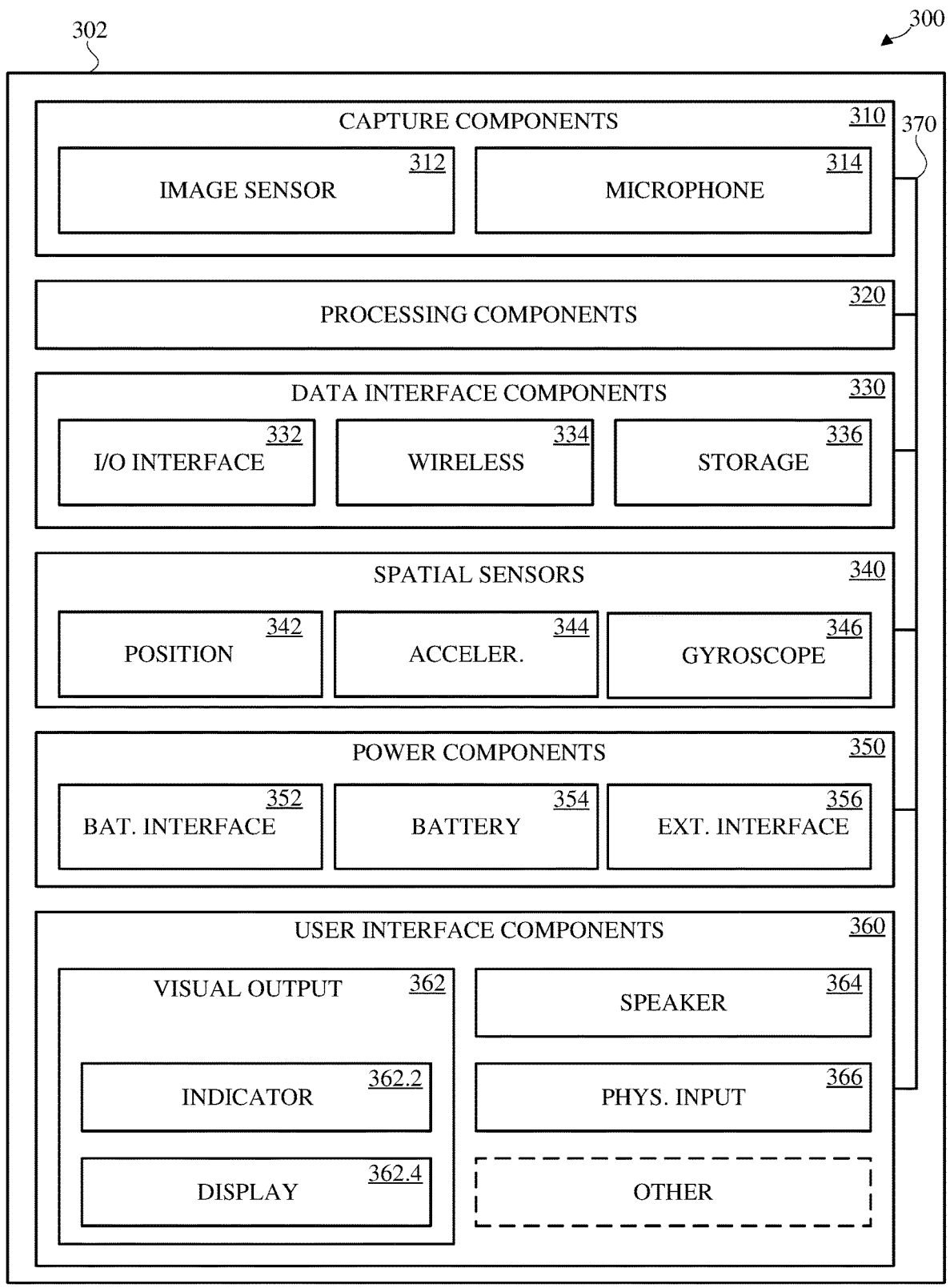
FIG. 3 is a block diagram of electronic components of an image capture apparatus.

FIGS. 1A-B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 134, an interconnect mechanism 136, and a display 138. Although not expressly shown in FIG. 1, the image capture apparatus 100 includes internal electronics, such as imaging electronics, power electronics, and the like, internal to the body 102 for capturing images and performing other functions of the image capture apparatus 100. An example showing internal electronics is shown in FIG. 3. The arrangement of the components of the image capture apparatus 100 shown in FIGS. 1A-B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used.

As shown in FIG. 1A, the image capture apparatus 100 includes the image capture device 104 structured on a front surface of, and within, the body 102. The image capture device 104 includes a lens. The lens of the image capture device 104 receives light incident upon the lens of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. Although one display 108 is shown in FIG. 1A, the image capture apparatus 100 may include multiple displays, which may be structured on respective surfaces of the body 102. In some implementations, the display 108 may be omitted or combined with another component of the image capture apparatus 100.

As shown in FIG. 1B, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1B, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. Although described as a button, the shutter button 112 may be another type of input device, such as a switch, a toggle, a slider, or a dial. Although one shutter button 112 is shown in FIG. 1A, the image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1A, the image capture apparatus 100 includes the door 114 coupled to the body 102, such as using the hinge mechanism 116. The door 114 may be secured to the body 102 using the latch mechanism 118 that releasably engages the body 102 at a position generally opposite the hinge mechanism 116. As shown in FIG. 1A, the door 114 includes the seal 120 and the battery interface 122. Although one door 114 is shown in FIG. 1A, the image capture apparatus 100 may include multiple doors respectively forming respective surfaces of the body 102, or portions thereof. Although not shown in FIGS. 1A-B, the door 114 may be removed from the body 102 by releasing the latch mechanism 118 from the body 102 and decoupling the hinge mechanism 116 from the body 102.

In FIG. 1A, the door 114 is shown in an open position such that the data interface 124 is accessible for communicating with external devices and the battery receptacle 126 is accessible for placement or replacement of a battery (not shown).

In FIG. 1B, the door 114 is shown in a closed position. In implementations in which the door 114 is in the closed position the seal 120 engages a flange (not shown) to provide an environmental seal. In implementations in which the door 114 is in the closed position the battery interface 122 engages the battery to secure the battery in the battery receptacle 126.

As shown in FIG. 1A, the image capture apparatus 100 includes the battery receptacle 126 structured to form a portion of an interior surface of the body 102. The battery receptacle 126 includes operative connections (not shown) for power transfer between the battery and the image capture apparatus 100. In some implementations, the battery receptable 126 may be omitted. Although one battery receptacle 126 is shown in FIG. 1A, the image capture apparatus 100 may include multiple battery receptacles.

As shown in FIG. 1A, the image capture apparatus 100 includes a first microphone 128 structured on a front surface of the body 102. As shown in FIG. 1A, the image capture apparatus 100 includes a second microphone 130 structured on a top surface of the body 102. As shown in FIG. 1B, the image capture apparatus 100 includes the drain microphone 132 structured on a side surface of the body 102. The drain microphone 132 is a microphone located behind a drain cover and is designed to drain liquid from audio components of the image capture apparatus 100. The image capture apparatus 100 may include other microphones (not shown) on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 134 structured on a bottom surface of the body 102. The speaker 134 outputs or presents audio, such as by playing back recorded audio or emitting sounds associated with notifications. Although one speaker 134 is shown in FIG. 1B, the image capture apparatus 100 may include multiple speakers structured on respective surfaces of the body 102.

As shown in FIG. 1B, the image capture apparatus 100 includes the interconnect mechanism 136 structured on a bottom surface of the body 102. The interconnect mechanism 136 removably connects the image capture apparatus 100 to an external structure, such as a handle grip, another mount, or a securing device. As shown in FIG. 1B, the interconnect mechanism 136 includes folding protrusions configured to move between a nested or collapsed position as shown in FIG. 1B and an extended or open position (not shown in FIG. 1B). The folding protrusions of the interconnect mechanism 136 shown in the collapsed position in FIG. 1B may be similar to the folding protrusions of the interconnect mechanism 214 shown in the extended or open position in FIGS. 2A-2B, except as is described herein or as is otherwise clear from context. The folding protrusions of the interconnect mechanism 136 in the extended or open position may be coupled to reciprocal protrusions of other devices such as handle grips, mounts, clips, or like devices. Although one interconnect mechanism 136 is shown in FIG. 1B, the image capture apparatus 100 may include multiple interconnect mechanisms structured on, or forming a portion of, respective surfaces of the body 102. In some implementations, the interconnect mechanism 136 may be omitted.

As shown in FIG. 1B, the image capture apparatus 100 includes the display 138 structured on, and forming a portion of, a rear surface of the body 102. The display 138 outputs, such as presents or displays, such as by emitting visible light, data, such as to show image information such as image previews, live video capture, or status information such as battery life, camera mode, elapsed time, and the like. In some implementations, the display 138 may be an interactive display, which may receive, detect, or capture input, such as user input representing user interaction with the image capture apparatus 100. Although one display 138 is shown in FIG. 1B, the image capture apparatus 100 may include multiple displays structured on respective surfaces of the body 102. In some implementations, the display 138 may be omitted or combined with another component of the image capture apparatus 100.

The image capture apparatus 100 may include features or components other than those described herein, such as other buttons or interface features. In some implementations, interchangeable lenses, cold shoes, and hot shoes, or a combination thereof, may be coupled to or combined with the image capture apparatus 100.

Although not shown in FIGS. 1A-1B, the image capture apparatus 100 may communicate with an external device, such as an external user interface device (not shown), via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link. The external device may store, process, display, or combination thereof, the images. The external user interface device may be a computing device, such as a smartphone, a tablet computer, a phablet, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
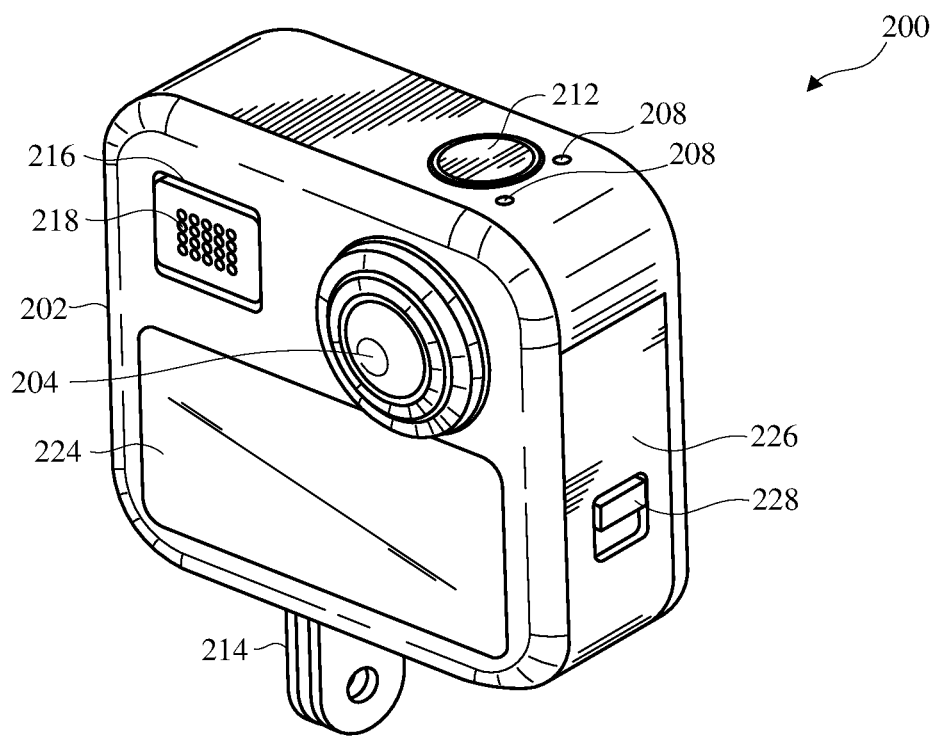
FIGS. 2A-B are isometric views of another example of an image capture apparatus.
Figure 2B:
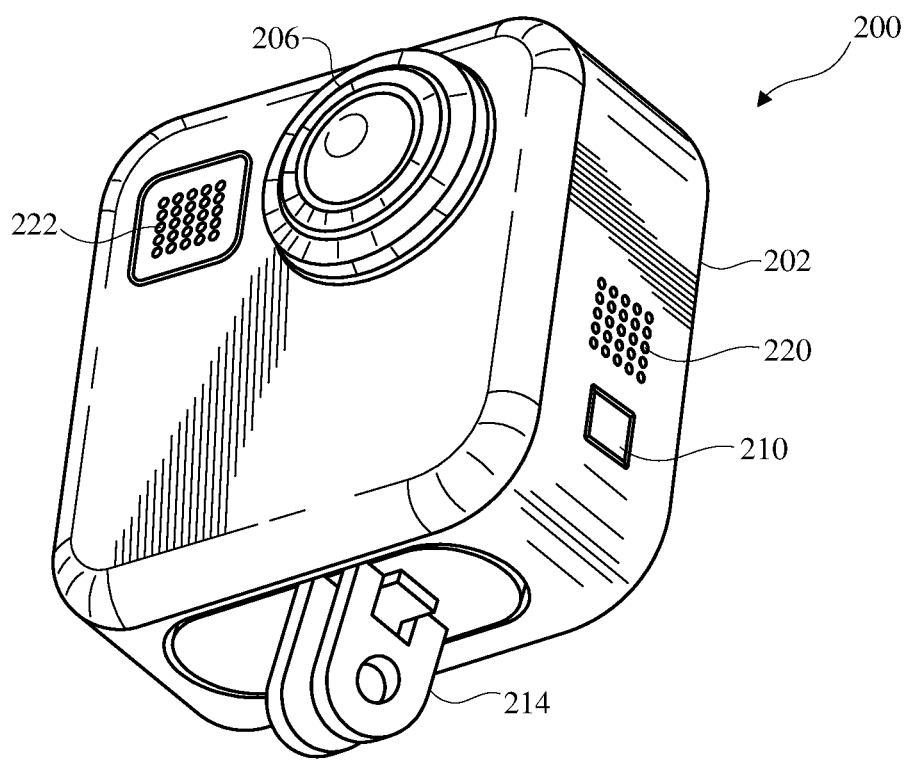

FIGS. 2A-2B illustrate another example of an image capture apparatus 200. The image capture apparatus 200 is similar to the image capture apparatus 100 shown in FIGS. 1A-B, except as is described herein or as is otherwise clear from context. The image capture apparatus 200 includes a body 202, a first image capture device 204, a second image capture device 206, indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used, except as is described herein or as is otherwise clear from context.

The body 202 of the image capture apparatus 200 may be similar to the body 102 shown in FIGS. 1A-1B, except as is described herein or as is otherwise clear from context.

As shown in FIG. 2A, the image capture apparatus 200 includes the first image capture device 204 structured on a front surface of the body 202. The first image capture device 204 includes a first lens. The first image capture device 204 may be similar to the image capture device 104 shown in FIG. 1A, except as is described herein or as is otherwise clear from context. As shown in FIG. 2B, the image capture apparatus 200 includes the second image capture device 206 structured on a rear surface of the body 202. The second image capture device 206 includes a second lens. The second image capture device 206 may be similar to the image capture device 104 shown in FIG. 1A, except as is described herein or as is otherwise clear from context. The image capture devices 204, 206 are disposed on opposing surfaces of the body 202, for example, in a back-to-back configuration, Janus configuration, or offset Janus configuration. Although two image capture devices 204, 206 are shown in FIGS. 2A-2B, the image capture apparatus 200 may include other image capture devices structured on respective surfaces of the body 202.

As shown in FIG. 2A, the image capture apparatus 200 includes the indicators 208 structured on a top surface of the body 202. The indicators 208 may be similar to the indicator 106 shown in FIG. 1A, except as is described herein or as is otherwise clear from context. For example, one of the indicators 208 may indicate a status of the first image capture device 204 and another one of the indicators 208 may indicate a status of the second image capture device 206. Although two indicator 208 are shown in FIGS. 2A-2B, the image capture apparatus 200 may include other indictors structured on respective surfaces of the body 202.

As shown in FIGS. 2A-B, the image capture apparatus 200 includes input mechanisms including a mode button 210, structured on a side surface of the body 202, and a shutter button 212, structured on a top surface of the body 202. The mode button 210 may be similar to the mode button 110 shown in FIG. 1B, except as is described herein or as is otherwise clear from context. The shutter button 212 may be similar to the shutter button 112 shown in FIG. 1A, except as is described herein or as is otherwise clear from context.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 3.

As shown in FIGS. 2A-2B, the image capture apparatus 200 includes the interconnect mechanism 214 structured on a bottom surface of the body 202. The interconnect mechanism 214 may be similar to the interconnect mechanism 136 shown in FIG. 1B, except as is described herein or as is otherwise clear from context. For example, the interconnect mechanism 136 shown in FIG. 1B is shown in the nested or collapsed position and the interconnect mechanism 214 shown in FIGS. 2A-2B are shown in an extended or open position.

As shown in FIG. 2A, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 134 shown in FIGS. 1A-1B, except as is described herein or as is otherwise clear from context. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts. As shown in FIG. 2A, a first audio component 218 is located on a front surface of the body 202. As shown in FIG. 2B, a second audio component 220 is located on a side surface of the body 202, and a third audio component 222 is located on a back surface of the body 202, Other numbers and configurations for the audio components may be used.

As shown in FIG. 2A, the image capture apparatus 200 includes the display 224 structured on a front surface of the body 202. The display 224 may be similar to the displays 108, 138 shown in FIGS. 1A-1B, except as is described herein or as is otherwise clear from context. The display 224 may include an I/O interface. The display 224 may receive touch inputs. The display 224 may display image information during video capture. The display 224 may provide status information to a user, such as status information indicating battery power level, memory card capacity, time elapsed for a recorded video, etc. Although one display 224 is shown in FIG. 2A, the image capture apparatus 200 may include multiple displays structured on respective surfaces of the body 202. In some implementations, the display 224 may be omitted or combined with another component of the image capture apparatus 200.

As shown in FIG. 2A, the image capture apparatus 200 includes the door 226 structured on, or forming a portion of, the side surface of the body 202. The door 226 may be similar to the door 114 shown in FIG. 1A, except as is described herein or as is otherwise clear from context. For example, the door 226 shown in FIG. 2A includes a release mechanism 228.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable lenses, cold shoes, or hot shoes.

Figure 2C:
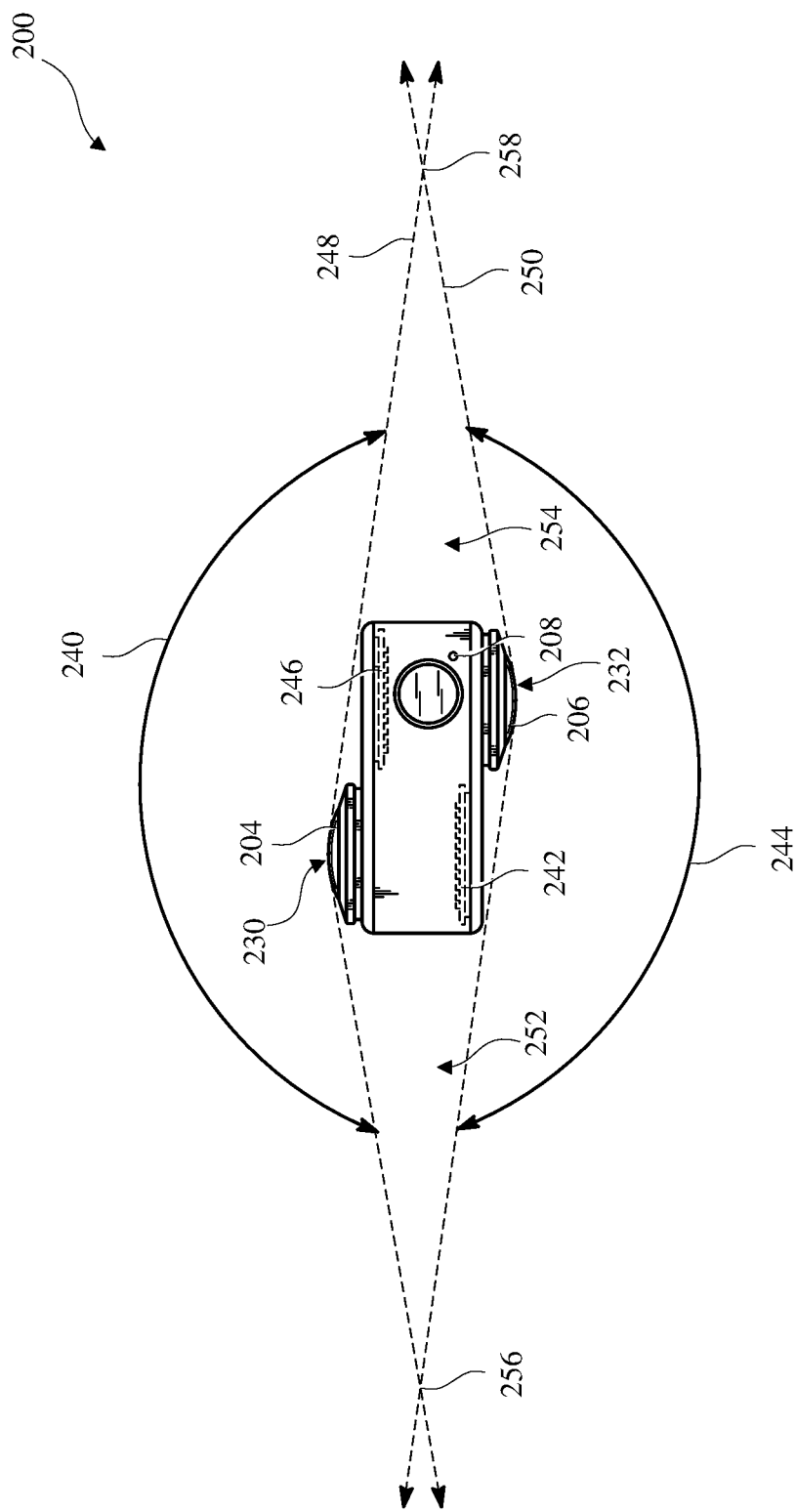
FIG. 2C is a top view of the image capture apparatus of FIGS. 2A-B.

FIG. 2C is a top view of the image capture apparatus 200 of FIGS. 2A-2B. For simplicity, some features or components of the image capture apparatus 200 shown in FIGS. 2A-2B are omitted from FIG. 2C.

As shown in FIG. 2C, the first image capture device 204 includes a first lens 230 and the second image capture device 206 includes a second lens 232. The image capture apparatus 200 captures spherical images. For example, the first image capture device 204 may capture a first image, such as a first hemispheric, or hyper-hemispherical, image, the second image capture device 206 may capture a second image, such as a second hemispheric, or hyper-hemispherical, image, and the image capture apparatus 200 may generate a spherical image incorporating or combining the first image and the second image, which may be captured concurrently, or substantially concurrently.

The first image capture device 204 defines a first field-of-view 240 wherein the first lens 230 of the first image capture device 204 receives light. The first lens 230 directs the received light corresponding to the first field-of-view 240 onto a first image sensor 242 of the first image capture device 204. For example, the first image capture device 204 may include a first lens barrel (not expressly shown), extending from the first lens 230 to the first image sensor 242.

The second image capture device 206 defines a second field-of-view 244 wherein the second lens 232 receives light. The second lens 232 directs the received light corresponding to the second field-of-view 244 onto a second image sensor 246 of the second image capture device 206. For example, the second image capture device 206 may include a second lens barrel (not expressly shown), extending from the second lens 232 to the second image sensor 246.

A boundary 248 of the first field-of-view 240 is shown using broken directional lines. A boundary 250 of the second field-of-view 244 is shown using broken directional lines. As shown, the image capture devices 204, 206 are arranged in a back-to-back (Janus) configuration such that the lenses 230, 232 face in generally opposite directions, such that the image capture apparatus 200 may capture spherical images. The first image sensor 242 captures a first hyper-hemispherical image plane from light entering the first lens 230, The second image sensor 246 captures a second hyper-hemispherical image plane from light entering the second lens 232.

As shown in FIG. 2C, the fields-of-view 240, 244 partially overlap such that the combination of the fields-of-view 240, 244 form a spherical field-of-view, except that one or more uncaptured areas 252, 254 may be outside of the fields-of-view 240, 244 of the lenses 230, 232. Light emanating from or passing through the uncaptured areas 252, 254, which may be proximal to the image capture apparatus 200, may be obscured from the lenses 230, 232 and the corresponding image sensors 242, 246, such that content corresponding to the uncaptured areas 252, 254 may be omitted from images captured by the image capture apparatus 200. In some implementations, the image capture devices 204, 206, or the lenses 230, 232 thereof, may be configured to minimize the uncaptured areas 252, 254.

Examples of points of transition, or overlap points, from the uncaptured areas 252, 254 to the overlapping portions of the fields-of-view 240, 244 are shown at 256, 258.

Images contemporaneously captured by the respective image sensors 242, 246 may be combined to form a combined image, such as a spherical image. Generating a combined image may include correlating the overlapping regions captured by the respective image sensors 242, 246, aligning the captured fields-of-view 240, 244, and stitching the images together to form a cohesive combined image. Stitching the images together may include correlating the overlap points 256, 258 with respective locations in corresponding images captured by the image sensors 242, 246. Although a planar view of the fields-of-view 240, 244 is shown in FIG. 2C, the fields-of-view 240, 244 are hyper-hemispherical.

A change in the alignment, such as position, tilt, or a combination thereof, of the image capture devices 204, 206, such as of the lenses 230, 232, the image sensors 242, 246, or both, may change the relative positions of the respective fields-of-view 240, 244, may change the locations of the overlap points 256, 258, such as with respect to images captured by the image sensors 242, 246, and may change the uncaptured areas 252, 254, which may include changing the uncaptured areas 252, 254 unequally.

Incomplete or inaccurate information indicating the alignment of the image capture devices 204, 206, such as the locations of the overlap points 256, 258, may decrease the accuracy, efficiency, or both of generating a combined image. In some implementations, the image capture apparatus 200 may maintain information indicating the location and orientation of the image capture devices 204, 206, such as of the lenses 230, 232, the image sensors 242, 246, or both, such that the fields-of-view 240, 244, the overlap points 256, 258, or both may be accurately determined, which may improve the accuracy, efficiency, or both of generating a combined image.

The lenses 230, 232 may be aligned along an axis (not shown), laterally offset from each other, off-center from a central axis of the image capture apparatus 200, or laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture apparatus 200 may be close to the length of a single lens barrel as opposed to twice the length of a single lens barrel as in a back-to-back lens configuration. Reducing the lateral distance between the lenses 230, 232 may improve the overlap in the fields-of-view 240, 244, such as by reducing the uncaptured areas 252, 254.

Images or frames captured by the image capture devices 204, 206 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 256, 258, may be matched accurately to minimize boundary discontinuities, FIG. 3 is a block diagram of electronic components in an image capture apparatus 300. The image capture apparatus 300 may be a single-lens image capture device, a multi-lens image capture device, or variations thereof, including an image capture apparatus with multiple capabilities such as the use of interchangeable integrated sensor lens assemblies. Components, such as electronic components, of the image capture apparatus 100 shown in FIGS. 1A-1B, or the image capture apparatus 200 shown in FIGS. 2A-C, may be implemented as shown in FIG. 3, except as is described herein or as is otherwise clear from context.

The image capture apparatus 300 includes a body 302. The body 302 may be similar to the body 102 shown in FIGS. 1A-1B, or the body 202 shown in FIGS. 2A-B, except as is described herein or as is otherwise clear from context. The body 302 includes electronic components such as capture components 310, processing components 320, data interface components 330, spatial sensors 340, power components 350, user interface components 360, and a bus 370.

The capture components 310 include an image sensor 312 for capturing images. Although one image sensor 312 is shown in FIG. 3, the capture components 310 may include multiple image sensors. The image sensor 312 may be similar to the image sensors 242, 246 shown in FIG. 2C, except as is described herein or as is otherwise clear from context. The image sensor 312 may be, for example, a charge-coupled device (CCD) sensor, an active pixel sensor (APS), a complementary metal—oxide—semiconductor (CMOS) sensor, or an N-type metal-oxide-semiconductor (NMOS) sensor. The image sensor 312 detects light, such as within a defined spectrum, such as the visible light spectrum or the infrared spectrum, incident through a corresponding lens such as the lens 230 with respect to the image sensor 242 as shown in FIG. 2C or the lens 232 with respect to the image sensor 246 as shown in FIG. 2C. The image sensor 312 captures detected light as image data and conveys the captured image data as electrical signals (image signals or image data) to the other components of the image capture apparatus 300, such as to the processing components 320, such as via the bus 370.

The capture components 310 include a microphone 314 for capturing audio. Although one microphone 314 is shown in FIG. 3, the capture components 310 may include multiple microphones. The microphone 314 detects and captures, or records, sound, such as sound waves incident upon the microphone 314. The microphone 314 may detect, capture, or record sound in conjunction with capturing images by the image sensor 312. The microphone 314 may detect sound to receive audible commands to control the image capture apparatus 300. The microphone 314 may be similar to the microphones 128, 130, 132 shown in FIGS. 1A-1B or the audio components 218, 220, 222 shown in FIGS. 2A-2B, except as is described herein or as is otherwise clear from context.

The processing components 320 perform image signal processing, such as filtering, tone mapping, or stitching, to generate, or obtain, processed images, or processed image data, based on image data obtained from the image sensor 312. The processing components 320 may include one or more processors having single or multiple processing cores. In some implementations, the processing components 320 may include, or may be, an application specific integrated circuit (ASIC) or a digital signal processor (DSP). For example, the processing components 320 may include a custom image signal processor. The processing components 320 conveys data, such as processed image data, with other components of the image capture apparatus 300 via the bus 370. In some implementations, the processing components 320 may include an encoder, such as an image or video encoder that may encode, decode, or both, the image data, such as for compression coding, transcoding, or a combination thereof.

Although not shown expressly in FIG. 3, the processing components 320 may include memory, such as a random-access memory (RAM) device, which may be non-transitory computer-readable memory. The memory of the processing components 320 may include executable instructions and data that can be accessed by the processing components 320.

The data interface components 330 communicates with other, such as external, electronic devices, such as a remote control, a smartphone, a tablet computer, a laptop computer, a desktop computer, or an external computer storage device. For example, the data interface components 330 may receive commands to operate the image capture apparatus 300. In another example, the data interface components 330 may transmit image data to transfer the image data to other electronic devices. The data interface components 330 may be configured for wired communication, wireless communication, or both. As shown, the data interface components 330 include an I/O interface 332, a wireless data interface 334, and a storage interface 336. In some implementations, one or more of the I/O interface 332, the wireless data interface 334, or the storage interface 336 may be omitted or combined.

The I/O interface 332 may send, receive, or both, wired electronic communications signals. For example, the I/O interface 332 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 332 is shown in FIG. 3, the data interface components 330 include multiple I/O interfaces. The I/O interface 332 may be similar to the data interface 124 shown in FIG. 1A, except as is described herein or as is otherwise clear from context.

The wireless data interface 334 may send, receive, or both, wireless electronic communications signals. The wireless data interface 334 may be a Bluetooth interface, a ZigBee interface, interface, an infrared link, a cellular link, a near field communications (NFC) link, or an Advanced Network Technology interoperability (ANT+) link. Although one wireless data interface 334 is shown in FIG. 3, the data interface components 330 include multiple wireless data interfaces. The wireless data interface 334 may be similar to the data interface 124 shown in FIG. 1A, except as is described herein or as is otherwise clear from context.

The storage interface 336 may include a memory card connector, such as a memory card receptacle, configured to receive and operatively couple to a removable storage device, such as a memory card, and to transfer, such as read, write, or both, data between the image capture apparatus 300 and the memory card, such as for storing images, recorded audio, or both captured by the image capture apparatus 300 on the memory card. Although one storage interface 336 is shown in FIG. 3, the data interface components 330 include multiple storage interfaces. The storage interface 336 may be similar to the data interface 124 shown in FIG. 1A, except as is described herein or as is otherwise clear from context.

The spatial, or spatiotemporal, sensors 340 detect the spatial position, movement, or both, of the image capture apparatus 300. As shown in FIG. 3, the spatial sensors 340 include a position sensor 342, an accelerometer 344, and a gyroscope 346. The position sensor 342, which may be a global positioning system (GPS) sensor, may determine a geospatial position of the image capture apparatus 300, which may include obtaining, such as by receiving, temporal data, such as via a GPS signal. The accelerometer 344, which may be a three-axis accelerometer, may measure linear motion, linear acceleration, or both of the image capture apparatus 300. The gyroscope 346, which may be a three-axis gyroscope, may measure rotational motion, such as a rate of rotation, of the image capture apparatus 300. In some implementations, the spatial sensors 340 may include other types of spatial sensors. In some implementations, one or more of the position sensor 342, the accelerometer 344, and the gyroscope 346 may be omitted or combined.

The power components 350 distribute electrical power to the components of the image capture apparatus 300 for operating the image capture apparatus 300. As shown in FIG. 3, the power components 350 include a battery interface 352, a battery 354, and an external power interface 356 (ext. interface). The battery interface 352 (bat. interface) operatively couples to the battery 354, such as via conductive contacts to transfer power from the battery 354 to the other electronic components of the image capture apparatus 300. The battery interface 352 may be similar to the battery receptacle 126 shown in FIG. 1A, except as is described herein or as is otherwise clear from context. The external power interface 356 obtains or receives power from an external source, such as a wall plug or external battery, and distributes the power to the components of the image capture apparatus 300, which may include distributing power to the battery 354 via battery interface 352 to charge the battery 354. Although one battery interface 352, one battery 354, and one external power interface 356 are shown in FIG. 3, any number of battery interfaces, batteries, and external power interfaces may be used. In some implementations, one or more of the battery interface 352, the battery 354, and the external power interface 356 may be omitted or combined. For example, in some implementations, the external interface 356 and the I/O interface 332 may be combined.

The user interface components 360 receive input, such as user input, from a user of the image capture apparatus 300, output, such as display or present, information to a user, or both receive input and output information, such as in accordance with user interaction with the image capture apparatus 300.

As shown in FIG. 3, the user interface components 360 include visual output components 362 to visually communicate information, such as to present captured images. As shown, the visual output components 362 include an indicator 362.2 and a display 362.4. The indicator 362.2 may be similar to the indicator 106 shown in FIG. 1A or the indicators 208 shown in FIG. 2A, except as is described herein or as is otherwise clear from context. The display 362.4 may be similar to the display 108 shown in FIG. 1A, the display 138 shown in FIG. 1B, or the display 224 shown in FIG. 2A, except as is described herein or as is otherwise clear from context. Although the visual output components 362 are shown in FIG. 3 as including one indicator 362.2, the visual output components 362 may include multiple indicators. Although the visual output components 362 are shown in FIG. 3 as including one display 362.4, the visual output components 362 may include multiple displays. In some implementations, one or more of the indicator 362.2 or the display 362.4 may be omitted or combined.

As shown in FIG. 3, the user interface components 360 include a speaker 364. The speaker 364 may be similar to the speaker 134 shown in FIG. 1B or the audio components 218, 220, 222 shown in FIGS. 2A-B, except as is described herein or as is otherwise clear from context. Although one speaker 364 is shown in FIG. 3, the user interface components 360 may include multiple speakers. In some implementations, the speaker 364 may be omitted or combined with another component of the image capture apparatus 300, such as the microphone 314.

As shown in FIG. 3, the user interface components 360 include a physical input interface 366. The physical input interface 366 may be similar to the shutter button 112 shown in FIG. 1A, the mode button 110 shown in FIG. 1B, the shutter button 212 shown in FIG. 2A, or the mode button 210 shown in FIG. 2B, except as is described herein or as is otherwise clear from context. Although one physical input interface 366 is shown in FIG. 3, the user interface components 360 may include multiple physical input interfaces. In some implementations, the physical input interface 366 may be omitted or combined with another component of the image capture apparatus 300. The physical input interface 366 may be, for example, a button, a toggle, a switch, a dial, or a slider.

As shown in FIG. 3, the user interface components 360 include a broken line border box labeled "other", to indicate that components of the image capture apparatus 300 other than the components expressly shown as included in the user interface components 360 may be user interface components. For example, the microphone 314 may receive, or capture, and process audio signals to obtain input data, such as user input data corresponding to voice commands. In another example, the image sensor 312 may receive, or capture, and process image data to obtain input data, such as user input data corresponding to visible gesture commands. In another example, one or more of the spatial sensors 340, such as a combination of the accelerometer 344 and the gyroscope 346, may receive, or capture, and process motion data to obtain input data, such as user input data corresponding to motion gesture commands.

Figure 5:
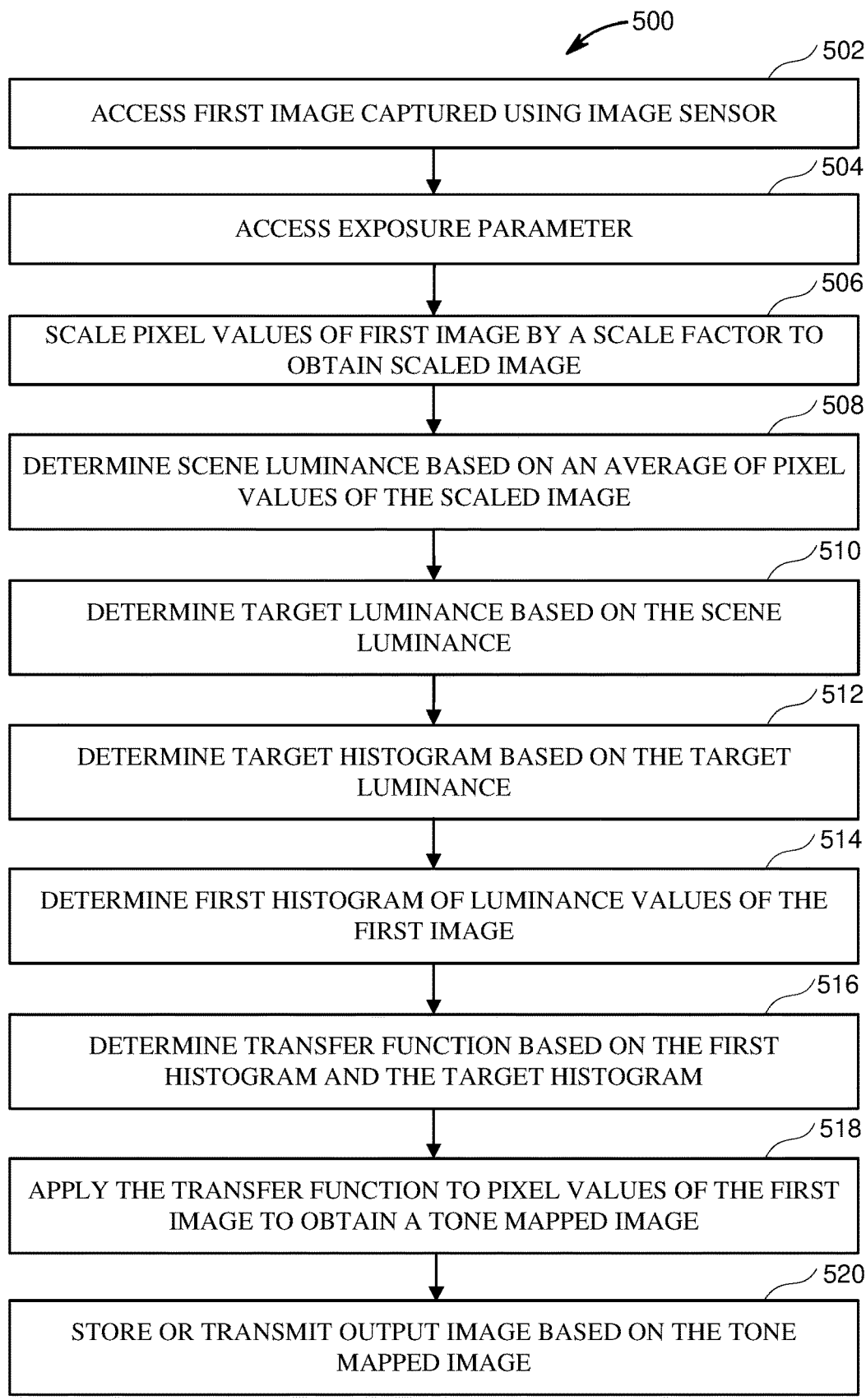
FIG. 5 is a flowchart of an example of a technique for tone mapping for image detection.
Figure 9:
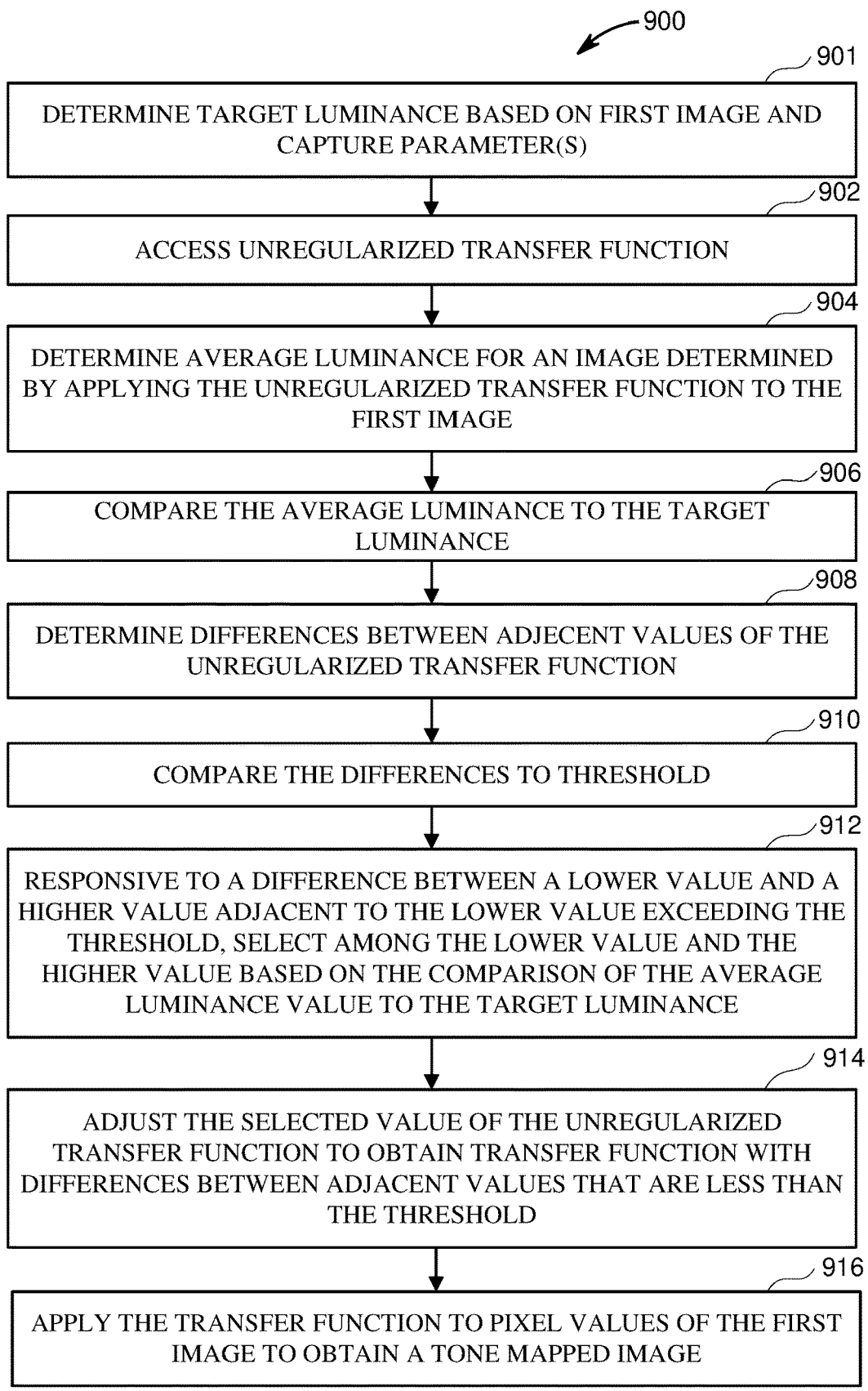
FIG. 9 is a flowchart of an example of a technique for tone mapping for image detection.

The image capture device 300 may be used to implement some or all of the techniques described in this disclosure, such as the technique 500 described in FIG. 5 or the technique 900 described in FIG. 9.

Figure 4:
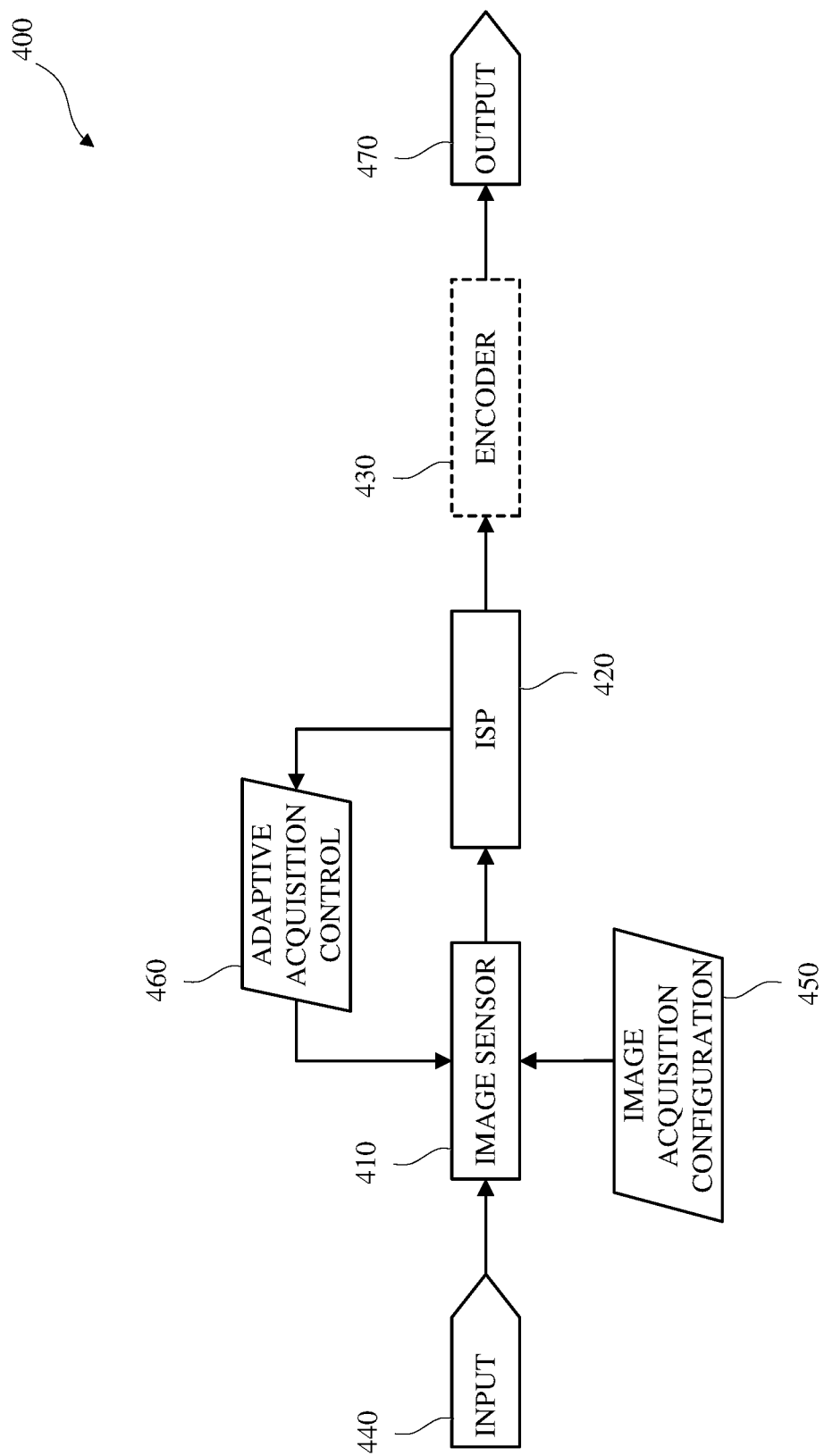
FIG. 4 is a flow diagram of an example of an image processing pipeline.

FIG. 4 is a block diagram of an example of an image processing pipeline 400. The image processing pipeline 400, or a portion thereof, is implemented in an image capture apparatus, such as the image capture apparatus 100 shown in FIGS. 1A-1B, the image capture apparatus 200 shown in FIGS. 2A-2C, the image capture apparatus 300 shown in FIG. 3, or another image capture apparatus. In some implementations, the image processing pipeline 400 may be implemented in a digital signal processor (DSP), an application-specific integrated circuit (ASIC), or a combination of a digital signal processor and an application-specific integrated circuit. One or more components of the pipeline 400 may be implemented in hardware, software, or a combination of hardware and software.

As shown in FIG. 4, the image processing pipeline 400 includes an image sensor 410, an image signal processor (ISP) 420, and an encoder 430. The encoder 430 is shown with a broken line border to indicate that the encoder may be omitted, or absent, from the image processing pipeline 400. In some implementations, the encoder 430 may be included in another device. In implementations that include the encoder 430, the image processing pipeline 400 may be an image processing and coding pipeline. The image processing pipeline 400 may include components other than the components shown in FIG. 4.

The image sensor 410 receives input 440, such as photons incident on the image sensor 410. The image sensor 410 captures image data (source image data). Capturing source image data includes measuring or sensing the input 440, which may include counting, or otherwise measuring, photons incident on the image sensor 410, such as for a defined temporal duration or period (exposure time). Capturing source image data includes converting the analog input 440 to a digital source image signal in a defined format, which may be referred to herein as "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern.

Although one image sensor 410 is shown in FIG. 4, the image processing pipeline 400 may include two or more image sensors. In some implementations, an image, or frame, such as an image, or frame, included in the source image signal, may be one of a sequence or series of images or frames of a video, such as a sequence, or series, of frames captured at a rate, or frame rate, which may be a number or cardinality of frames captured per defined temporal period, such as twenty-four, thirty, sixty, or one-hundred twenty frames per second.

The image sensor 410 obtains image acquisition configuration data 450. The image acquisition configuration data 450 may include image cropping parameters, binning/skipping parameters, pixel rate parameters, bitrate parameters, resolution parameters, framerate parameters, or other image acquisition configuration data or combinations of image acquisition configuration data. Obtaining the image acquisition configuration data 450 may include receiving the image acquisition configuration data 450 from a source other than a component of the image processing pipeline 400. For example, the image acquisition configuration data 450, or a portion thereof, may be received from another component, such as a user interface component, of the image capture apparatus implementing the image processing pipeline 400, such as one or more of the user interface components 360 shown in FIG. 3. The image sensor 410 obtains, outputs, or both, the source image data in accordance with the image acquisition configuration data 450. For example, the image sensor 410 may obtain the image acquisition configuration data 450 prior to capturing the source image.

The image sensor 410 receives, or otherwise obtains or accesses, adaptive acquisition control data 460, such as auto exposure (AE) data, auto white balance (AWB) data, global tone mapping (GTM) data, Auto Color Lens Shading (ACLS) data, color correction data, or other adaptive acquisition control data or combination of adaptive acquisition control data. For example, the image sensor 410 receives the adaptive acquisition control data 460 from the image signal processor 420. The image sensor 410 Obtains, outputs, or both, the source image data in accordance with the adaptive acquisition control data 460.

The image sensor 410 controls, such as configures, sets, or modifies, one or more image acquisition parameters or settings, or otherwise controls the operation of the image sensor 420, in accordance with the image acquisition configuration data 450 and the adaptive acquisition control data 460. For example, the image sensor 410 may capture a first source image using, or in accordance with, the image acquisition configuration data 450, and in the absence of adaptive acquisition control data 460 or using defined values for the adaptive acquisition control data 460, output the first source image to the image signal processor 420, obtain adaptive acquisition control data 460 generated using the first source image data from the image signal processor 420, and capture a second source image using, or in accordance with, the image acquisition configuration data 450 and the adaptive acquisition control data 460 generated using the first source image.

The image sensor 410 outputs source image data, which may include the source image signal, image acquisition data, or a combination thereof, to the image signal processor 420.

The image signal processor 420 receives, or otherwise accesses or obtains, the source image data from the image sensor 410. The image signal processor 420 processes the source image data to obtain input image data. In some implementations, the image signal processor 420 converts the raw image signal (KGB data) to another format, such as a format expressing individual pixels using a combination of values or components, such as a luminance, or lama, value (Y), a blue chrominance, or chroma, value (U or Cb), and a red chroma value (V or Cr), such as the YUV or YCbCr formats.

Processing the source image data includes generating the adaptive acquisition control data 460. The adaptive acquisition control data 460 includes data for controlling the acquisition of a one or more images by the image sensor 410.

The image signal processor 420 includes components not expressly shown in FIG. 4 for obtaining and processing the source image data. For example, the image signal processor 420 may include one or more sensor input (SEN) components (not shown), one or more sensor readout (SRO) components (not shown), one or more image data compression components, one or more image data decompression components, one or more internal memory, or data storage, components, one or more Bayer-to-Bayer (B2B) components, one or more local motion estimation (LME) components, one or more local motion compensation (LMC) components, one or more global motion compensation (GMC) components, one or more Bayer-to-RGB (B2R) components, one or more image processing units (IPU), one or more high dynamic range (HDR) components, one or more three-dimensional noise reduction (3DNR) components, one or more sharpening components, one or more raw-to-YUV (R2Y) components, one or more Chroma Noise Reduction (CNR) components, one or more local tone mapping (LTM) components, one or more YUV-to-YUV (Y2Y) components, one or more warp and blend components, one or more stitching cost components, one or more scaler components, or a configuration controller. The image signal processor 420, or respective components thereof, may be implemented in hardware, software, or a combination of hardware and software. Although one image signal processor 420 is shown in FIG. 4, the image processing pipeline 400 may include multiple image signal processors. In implementations that include multiple image signal processors, the functionality of the image signal processor 420 may be divided or distributed among the image signal processors.

In some implementations, the image signal processor 420 may implement or include multiple parallel, or partially parallel paths for image processing. For example, for high dynamic range image processing based on two source images, the image signal processor 420 may implement a first image processing path for a first source image and a second image processing path for a second source image, wherein the image processing paths may include components that are shared among the paths, such as memory components, and may include components that are separately included in each path, such as a first sensor readout component in the first image processing path and a second sensor readout component in the second image processing path, such that image processing by the respective paths may be performed in parallel, or partially in parallel.

The image signal processor 420, or one or more components thereof, such as the sensor input components, may perform black-point removal for the image data. In some implementations, the image sensor 410 may compress the source image data, or a portion thereof, and the image signal processor 420, or one or more components thereof, such as one or more of the sensor input components or one or more of the image data decompression components, may decompress the compressed source image data to obtain the source image data.

The image signal processor 420, or one or more components thereof, such as the sensor readout components, may perform dead pixel correction for the image data. The sensor readout component may perform scaling for the image data. The sensor readout component may obtain, such as generate or determine, adaptive acquisition control data, such as auto exposure data, auto white balance data, global tone mapping data, Auto Color Lens Shading data, or other adaptive acquisition control data, based on the source image data.

The image signal processor 420, or one or more components thereof, such as the image data compression components, may obtain the image data, or a portion thereof, such as from another component of the image signal processor 420, compress the image data, and output the compressed image data, such as to another component of the image signal processor 420, such as to a memory component of the image signal processor 420.

The image signal processor 420, or one or more components thereof, such as the image data decompression, or uncompression, components (UCX), may read, receive, or otherwise access, compressed image data and may decompress, or uncompress, the compressed image data to obtain image data. In some implementations, other components of the image signal processor 420 may request, such as send a request message or signal, the image data from an uncompression component, and, in response to the request, the uncompression component may obtain corresponding compressed image data, uncompress the compressed image data to obtain the requested image data, and output, such as send or otherwise make available, the requested image data to the component that requested the image data. The image signal processor 420 may include multiple uncompression components, which may be respectively optimized for uncompression with respect to one or more defined image data formats.

The image signal processor 420, or one or more components thereof, such as the internal memory, or data storage, components. The memory components store image data, such as compressed image data internally within the image signal processor 420 and are accessible to the image signal processor 420, or to components of the image signal processor 420. In some implementations, a memory component may be accessible, such as write accessible, to a defined component of the image signal processor 420, such as an image data compression component, and the memory component may be accessible, such as read accessible, to another defined component of the image signal processor 420, such as an uncompression component of the image signal processor 420.

The image signal processor 420, or one or more components thereof, such as the Bayer-to-Bayer components, which may process image data, such as to transform or convert the image data from a first Bayer format, such as a signed 15-bit Bayer format data, to second Bayer format, such as an unsigned 14-bit Bayer format. The Bayer-to-Bayer components may obtain, such as generate or determine, high dynamic range Tone Control data based on the current image data.

Although not expressly shown in FIG. 4, in some implementations, a respective Bayer-to-Bayer component may include one or more sub-components. For example, the Bayer-to-Bayer component may include one or more gain components. In another example, the Bayer-to-Bayer component may include one or more offset map components, which may respectively apply respective offset maps to the image data. The respective offset maps may have a configurable size, which may have a maximum size, such as 129×129. The respective offset maps may have a non-uniform grid. Applying the offset map may include saturation management, which may preserve saturated areas on respective images based on R, G, and B values. The values of the offset map may be modified per-frame and double buffering may be used for the map values. A respective offset map component may, such as prior to Bayer noise removal (denoising), compensate for non-uniform blackpoint removal, such as due to non-uniform thermal heating of the sensor or image capture device. A respective offset map component may, such as subsequent to Bayer noise removal, compensate for flare, such as flare on hemispherical lenses, and/or may perform local contrast enhancement, such a dehazing or local tone mapping.

In another example, the Bayer-to-Bayer component may include a Bayer Noise Reduction (Bayer NR) component, which may convert image data, such as from a first format, such as a signed 15-bit Bayer format, to a second format, such as an unsigned 14-bit Bayer format. In another example, the Bayer-to-Bayer component may include one or more lens shading (FSHD) component, which may, respectively, perform lens shading correction, such as luminance lens shading correction, color lens shading correction, or both. In some implementations, a respective lens shading component may perform exposure compensation between two or more sensors of a multi-sensor image capture apparatus, such as between two hemispherical lenses. In some implementations, a respective lens shading component may apply map-based gains, radial model gain, or a combination, such as a multiplicative combination, thereof. In some implementations, a respective lens shading component may perform saturation management, which may preserve saturated areas on respective images. Map and lookup table values for a respective lens shading component may be configured or modified on a per-frame basis and double buffering may be used.

In another example, the Bayer-to-Bayer component may include a PZSFT component. In another example, the Bayer-to-Bayer component may include a half-RGB (½ RGB) component. In another example, the Bayer-to-Bayer component may include a color correction (CC) component, which may obtain subsampled data for local tone mapping, which may be used, for example, for applying an unsharp mask. In another example, the Bayer-to-Bayer component may include a Tone Control (TC) component, which may obtain subsampled data for local tone mapping, which may be used, for example, for applying an unsharp mask. In another example, the Bayer-to-Bayer component may include a Gamma (GM) component, which may apply a lookup-table independently per channel for color rendering (gamma curve application). Using a lookup-table, which may be an array, may reduce resource utilization, such as processor utilization, using an array indexing operation rather than more complex computation. The gamma component may obtain subsampled data for local tone mapping, which may be used, for example, for applying an unsharp mask.

In another example, the Bayer-to-Bayer component may include an RGB binning (RGB BIN) component, which may include a configurable binning factor, such as a binning factor configurable in the range from four to sixteen, such as four, eight, or sixteen. One or more sub-components of the Bayer-to-Bayer component, such as the RGB Binning component and the half-RGB component, may operate in parallel. The RGB binning component may output image data, such as to an external memory, which may include compressing the image data. The output of the RGB binning component may be a binned image, which may include low-resolution image data or low-resolution image map data. The output of the RGB binning component may be used to extract statistics for combing images, such as combining hemispherical images. The output of the RGB binning component may be used to estimate flare on one or more lenses, such as hemispherical lenses. The RGB binning component may obtain G channel values for the binned image by averaging Gr channel values and Gb channel values. The RGB binning component may obtain one or more portions of or values for the binned image by averaging pixel values in spatial areas identified based on the binning factor. In another example, the Bayer-to-Bayer component may include, such as for spherical image processing, an RGB-to-YUV component, which may obtain tone mapping statistics, such as histogram data and thumbnail data, using a weight map, which may weight respective regions of interest prior to statistics aggregation.

The image signal processor 420, or one or more components thereof, such as the local motion estimation components, which may generate local motion estimation data for use in image signal processing and encoding, such as in correcting distortion, stitching, and/or motion compensation. For example, the local motion estimation components may partition an image into blocks, arbitrarily shaped patches, individual pixels, or a combination thereof. The local motion estimation components may compare pixel values between frames, such as successive images, to determine displacement, or movement, between frames, which may be expressed as motion vectors (local motion vectors).

The image signal processor 420, or one or more components thereof, such as the local motion compensation components, which may obtain local motion data, such as local motion vectors, and may spatially apply the local motion data to an image to obtain a local motion compensated image or frame and may output the local motion compensated image or frame to one or more other components of the image signal processor 420.

The image signal processor 420, or one or more components thereof, such as the global motion compensation components, may receive, or otherwise access, global motion data, such as global motion data from a gyroscopic unit of the image capture apparatus, such as the gyroscope 346 shown in FIG. 3, corresponding to the current frame. The global motion compensation component may apply the global motion data to a current image to obtain a global motion compensated image, which the global motion compensation component may output, or otherwise make available, to one or more other components of the image signal processor 420

The image signal processor 420, or one or more components thereof, such as the Bayer-to-RGB components, which convert the image data from Bayer format to an RGB format. The Bayer-to-RGB components may implement white balancing and demosaicing. The Bayer-to-RGB components respectively output, or otherwise make available, RGB format image data to one or more other components of the image signal processor 420.

The image signal processor 420, or one or more components thereof, such as the image processing units, which perform warping, image registration, electronic image stabilization, motion detection, object detection, or the like. The image processing units respectively output, or otherwise make available, processed, or partially processed, image data to one or more other components of the image signal processor 420.

The image signal processor 420, or one or more components thereof, such as the high dynamic range components, may, respectively, generate high dynamic range images based on the current input image, the corresponding local motion compensated frame, the corresponding global motion compensated frame, or a combination thereof. The high dynamic range components respectively output, or otherwise make available, high dynamic range images to one or more other components of the image signal processor 420.

The high dynamic range components of the image signal processor 420 may, respectively, include one or more high dynamic range core components, one or more tone control (TC) components, or one or more high dynamic range core components and one or more tone control components. For example, the image signal processor 420 may include a high dynamic range component that includes a high dynamic range core component and a tone control component. The high dynamic range core component may obtain, or generate, combined image data, such as a high dynamic range image, by merging, fusing, or combining the image data, such as unsigned 14-bit RGB format image data, for multiple, such as two, images (HDR fusion) to obtain, and output, the high dynamic range image, such as in an unsigned 23-bit RGB format (full dynamic data). The high dynamic range core component may output the combined image data to the Tone Control component, or to other components of the image signal processor 420. The Tone Control component may compress the combined image data, such as from the unsigned 23-bit RGB format data to an unsigned 17-bit RGB format (enhanced dynamic data).

The image signal processor 420, or one or more components thereof, such as the three-dimensional noise reduction components reduce image noise for a frame based on one or more previously processed frames and output, or otherwise make available, noise reduced images to one or more other components of the image signal processor 420. In some implementations, the three-dimensional noise reduction component may be omitted or may be replaced by one or more lower-dimensional noise reduction components, such as by a spatial noise reduction component. The three-dimensional noise reduction components of the image signal processor 420 may, respectively, include one or more temporal noise reduction (TNR) components, one or more raw-to-raw (R2R) components, or one or more temporal noise reduction components and one or more raw-to-raw components. For example, the image signal processor 420 may include a three-dimensional noise reduction component that includes a temporal noise reduction component and a raw-to-raw component.

The image signal processor 420, or one or more components thereof, such as the sharpening components, obtains sharpened image data based on the image data, such as based on noise reduced image data, which may recover image detail, such as detail reduced by temporal denoising or warping. The sharpening components respectively output, or otherwise make available, sharpened image data to one or more other components of the image signal processor 420.

The image signal processor 420, or one or more components thereof, such as the raw-to-YUV components, may transform, or convert, image data, such as from the raw image format to another image format, such as the YUV format, which includes a combination of a luminance (Y)

component and two chrominance (UV) components. The raw-to-YUV components may, respectively, demosaic, color process, or a both, images.

Although not expressly shown in FIG. 4, in some implementations, a respective raw-to-YUV component may include one or more sub-components. For example, the raw-to-YUV component may include a white balance (WB) component, which performs white balance correction on the image data. In another example, a respective raw-to-YUV component may include one or more color correction components (CC0, CC1), which may implement linear color rendering, which may include applying a 3×3 color matrix. For example, the raw-to-YUV component may include a first color correction component (CC0) and a second color correction component (CC1). In another example, a respective raw-to-YUV component may include a three-dimensional lookup table component, such as subsequent to a first color correction component. Although not expressly shown in FIG. 4, in some implementations, a respective raw-to-YUV component may include a Multi-Axis Color Correction (MCC) component, such as subsequent to a three-dimensional lookup table component, which may implement non-linear color rendering, such as in Hue, Saturation, Value (HSV) space.

In another example, a respective raw-to-YUV component may include a blackpoint RGB removal (BPRGB) component, which may process image data, such as low intensity values, such as values within a defined intensity threshold, such as less than or equal to, $2^8$, to obtain histogram data wherein values exceeding a defined intensity threshold may be omitted, or excluded, from the histogram data processing. In another example, a respective raw-to-YUV component may include a Multiple Tone Control (Multi-TC) component, which may convert image data, such as unsigned 17-bit RGB image data, to another format, such as unsigned 14-bit RGB image data. The Multiple Tone Control component may apply dynamic tone mapping to the Y channel (luminance) data, which may be based on, for example, image capture conditions, such as light conditions or scene conditions. The tone mapping may include local tone mapping, global tone mapping, or a combination thereof.

In another example, a respective raw-to-YUV component may include a Gamma (GM) component, which may convert image data, such as unsigned 14-bit RGB image data, to another format, such as unsigned 10-bit RGB image data. The Gamma component may apply a lookup-table independently per channel for color rendering (gamma curve application). Using a lookup-table, which may be an array, may reduce resource utilization, such as processor utilization, using an array indexing operation rather than more complex computation. In another example, a respective raw-to-YUV component may include a three-dimensional lookup table (3DLUT) component, which may include, or may be, a three-dimensional lookup table, which may map RGB input values to RGB output values through a non-linear function for non-linear color rendering. In another example, a respective raw-to-YUV component may include a Multi-Axis Color Correction (MCC) component, which may implement non-linear color rendering. For example, the multi-axis color correction component may perform color non-linear rendering, such as in Hue, Saturation, Value (HSV) space.

The image signal processor 420, or one or more components thereof, such as the Chroma Noise Reduction (CNR) components, may perform chroma denoising, luma denoising, or both.

The image signal processor 420, or one or more components thereof, such as the local tone mapping components, may perform multi-scale local tone mapping using a single pass approach or a multi-pass approach on a frame at different scales. The as the local tone mapping components may, respectively, enhance detail and may omit introducing artifacts. For example, the Local Tone Mapping components may, respectively, apply tone mapping, which may be similar to applying an unsharp-mask. Processing an image by the local tone mapping components may include obtaining, processing, such as in response to gamma correction, tone control, or both, and using a low-resolution map for local tone mapping.

The image signal processor 420, or one or more components thereof, such as the YUV-to-YUV (Y2Y) components, may perform local tone mapping of YUV images. In some implementations, the YUV-to-YUV components may include multi-scale local tone mapping using a single pass approach or a multi-pass approach on a frame at different scales.

The image signal processor 420, or one or more components thereof, such as the warp and blend components, may warp images, blend images, or both. In some implementations, the warp and blend components may warp a corona around the equator of a respective frame to a rectangle. For example, the warp and blend components may warp a corona around the equator of a respective frame to a rectangle based on the corresponding low-resolution frame. The warp and blend components, may, respectively, apply one or more transformations to the frames, such as to correct for distortions at image edges, which may be subject to a close to identity constraint.

The image signal processor 420, or one or more components thereof, such as the stitching cost components, may generate a stitching cost map, which may be represented as a rectangle having disparity (x) and longitude (y) based on a warping. Respective values of the stitching cost map may be a cost function of a disparity (x) value for a corresponding longitude. Stitching cost maps may be generated for various scales, longitudes, and disparities.

The image signal processor 420, or one or more components thereof, such as the scaler components, may scale images, such as in patches, or blocks, of pixels, such as 16×16 blocks, 8×8 blocks, or patches or blocks of any other size or combination of sizes.

The image signal processor 420, or one or more components thereof, such as the configuration controller, may control the operation of the image signal processor 420, or the components thereof.

The image signal processor 420 outputs processed image data, such as by storing the processed image data in a memory of the image capture apparatus, such as external to the image signal processor 420, or by sending, or otherwise making available, the processed image data to another component of the image processing pipeline 400, such as the encoder 430, or to another component of the image capture apparatus.

The encoder 430 encodes or compresses the output of the image signal processor 420. In some implementations, the encoder 430 implements one or more encoding standards, which may include motion estimation. The encoder 430 outputs the encoded processed image to an output 470. In an embodiment that does not include the encoder 430, the image signal processor 420 outputs the processed image to the output 470. The output 470 may include, for example, a display, such as a display of the image capture apparatus, such as one or more of the displays 108, 138 shown in FIG. 1, the display 224 shown in FIG. 2, or the display 362.4 shown in FIG. 3, to a storage device, or both. The output 470 is a signal, such as to an external device.

The image processing pipeline 400, or a portion or portions thereof, may be used to implement some or all of the techniques described in this disclosure, such as the technique 500 described in FIG. 5 or the technique 900 described in FIG. 9.

FIG. 5 is a flowchart of an example of a technique 500 for tone mapping for image detection. The technique 500 may use measurements of luminance of a scene to determine a target luminance for an image and a target histogram of luminance values that can be used determine a transfer function for tone mapping the image. The technique 500 includes accessing 502 a first image detected using an image sensor; accessing 504 an exposure parameter used to detect the first image; scaling 506 pixel values of the first image by a scale factor inversely proportional to the exposure parameter (exposure duration, or time, multiplied by ISO or gain) to obtain a scaled image; determining 508 a scene luminance based on an average of pixel values of the scaled image; determining 510 a target luminance based on the scene luminance; determining 512 a target histogram based on the target luminance; determining 514 a first histogram of luminance values of the first image; determining 516 a transfer function based on the first histogram and the target histogram; applying 518 the transfer function to pixel values of the first image to produce a tone mapped image; and storing or transmitting 520 an output image based on the tone mapped image. For example, the technique 500 may be implemented using the image capture device 100 of FIGS. 1A-B. For example, the technique 500 may be implemented using the image capture device 200 of FIGS. 2A-C. For example, the technique 500 may be implemented using the image capture device 300 of FIG. 3.

The technique 500 includes accessing 502 a first image detected using an image sensor (e.g., the first image sensor 232 or the image sensors 312). The image sensor may be part of an image capture device (e.g., the image capture device 100, the image capture device 200, or the image capture device 300). For example, the first image may be a hyper-hemispherical image. For example, the first image may be accessed 502 from the first image sensor or from memory via a bus using a memory interface (e.g., the storage interface 336). In some implementations, the first image may be accessed 502 via a communications interface (e.g., the I/O interface 332 or the wireless data interface 334). For example, the first image may be accessed 502 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the first image may be accessed 502 via a front ISP that performs some initial processing on the accessed 502 first image. For example, the first image may represent each pixel value in a defined format, such as in a RAW image signal format, a YUV image signal format, or a compressed format (e.g., an MPEG or PEG compressed bitstream). For example, the first image may be stored in a format using the Bayer color mosaic pattern. In some implementations, the first image may be a frame of video. In some implementations, the first image may be a still image.

The technique 500 includes accessing 504 an exposure parameter, which may include an exposure time parameter, or exposure duration, a gain, both, or a combination, such as multiplicative, thereof, used to detect the first image. The exposure time parameter specifies a duration or period of time during which the image sensor captured photons to detect the first image. For example, the exposure time parameter may be used to control a mechanical shutter for the image sensor or an electronic integration time for the image sensor. For example, the exposure parameter may be accessed 502 from the first image sensor or from memory via a bus using a memory interface (e.g., the storage interface 336). In some implementations, the exposure parameter may be accessed 502 via a communications interface (e.g., the I/O interface 332 or the wireless data interface 334). For example, the exposure parameter may be accessed 502 via a wireless or wired communications interface (e.g., Wi-Fi, Bluetooth, USB, HDMI, Wireless USB, Near Field Communication (NFC), Ethernet, a radio frequency transceiver, and/or other interfaces). In some implementations, additional image capture parameters for the image sensor that were used to detect the first image are accessed along with the exposure parameter, such as an analog gain of the image sensor and/or a digital gain that was applied to the first image.

The technique 500 includes scaling 506 pixel values of the first image by a scale factor inversely proportional to the exposure parameter to obtain a scaled image. For example, the scaled image may be determined as:

$$S = F * (1/e)$$

where F is a matrix of pixel values of the first image, e is a scalar proportional to the exposure parameter, and S is a matrix of pixel values of the scaled image. In some implementations, the image sensor and/or preprocessing blocks are configured to apply a variable gain when detecting images and these gains may be cancelled in the scaled image. To cancel such gains in the image detection equipment, the scale factor may be inversely proportional to one or more gain parameters used to detect the first image. For example, the scaled image may be determined as:

$$S = F * (1/(e*a*d))$$

where a is a scalar proportional to an analog gain parameter of the image sensor that was used to detect the first image and d is a scalar proportional to a digital gain parameter of the image sensor or an ISP front-end that was used to detect the first image. The scaled image may provide a measurement of the illumination of a scene depicted in the first image that is approximately independent of the configuration parameters of the image sensor for image detection. In some implementations, the first image is down-sampled to a low-resolution thumbnail version of the first image before the scaling 506 is applied to pixel values of the first image that occur in the thumbnail and the resulting scaled image is a thumbnail. In some implementations, scaling 506 is applied to multiple color channels of the first image. In some implementations, scaling 506 is applied to only a luminance channel of the first image.

The technique 500 includes determining 508 a scene luminance based on an average of pixel values of the scaled image. For example, the scene luminance may be estimated as an average of the pixel values of a luminance channel of the scaled image. In some implementations a weighted average may be used (e.g., weighting pixels based on their distance from an optical center of the first image).

The technique 500 includes determining 510 a target luminance based on the scene luminance. What level of illumination results in the best image quality may vary based on the lighting conditions of the scene. In some implementations, the target luminance is determined 510 to be proportional to the scene luminance. In some implementations, the target luminance is determined 510 as a non-linear function of the scene luminance. For example, where the scene luminance exceeds a high threshold, a bright target luminance may be selected; where the scene luminance is below a low threshold, a dark target luminance may be selected; and otherwise, a default or standard target luminance may be selected.

The technique 500 includes determining 512 a target histogram based on the target luminance. The target histogram may include bins that partition a dynamic range of the pixel values of the first image and specify a frequency or count for each of these bins. The target histogram may be used to determine a transfer function for a tone mapping that will tend to concentrate the luminance levels for pixels of the first image near the target luminance. For example, the target histogram may be determined 512 based on a Gaussian function with mean equal to the target luminance. In some implementations, the target luminance is determined by an autoexposure module and the target histogram is determined by a global tone mapping module.

The technique 500 includes determining 514 a first histogram of luminance values of the first image. For example, the first histogram may use the same partition of the dynamic range of the pixel values as the target histogram and include counts of pixels of the first image occurring in each of these bins.

The technique 500 includes determining 516 a transfer function based on the first histogram and the target histogram. In some implementations, the transfer function is determined 516 by determining gains that will change pixel values from bins of the first histogram that are overpopulated relative to the target histogram to bins that are underpopulated relative to the target histogram. For example, the transfer function may be encoded as an array of gains associated with respective bins in a partition of the dynamic range of the pixel values. For example, the transfer function may be encoded as an array of output values associated with respective bins in a partition of the dynamic range of the pixel values (e.g., implemented as a look-up table). In some implementations, the transfer function is determined 516 such that the application of the transfer function on the first image generates a tone mapped image that has a second histogram of luminance values within a threshold range of the target histogram.

It may enhance image quality to limit derivative of the transfer function (e.g., as approximated by the difference between values or gains for adjacent bins) to an acceptable range. A process of limiting the derivative of the transfer function may be referred to a regularization of the transfer function. In some implementations, regularization is applied to an initial version of the transfer function that tries to match the target histogram closely. For example, regularization may be applied locally to individual pairs of adjacent gains or values of the transfer function. When locally regularizing a pair of adjacent transfer function values, it is possible to reduce the delta between them by raising the lower value and/or by lowering the higher of the two values. In some implementations, a local regularization scheme can be made to stay closer to achieving the target luminance for the first image by keeping a running average of the luminance that would result from application of the current version of the transfer function and selecting whether to raise the lower value or drop the higher value based on comparison of this running average luminance to the target luminance for the first image. For example, determining 516 the transfer function may include implementing the technique 600 of FIG. 6 to regularize the transfer function.

It may also improve image quality to avoid introducing artifacts in the first image through a tone mapping in portions of the image that correspond to uniform expanses of pixels (e.g., corresponding to a blue sky or a white wall in the background of the first image). Pixels of the image corresponding to these large uniform regions may preserved by setting unity gain in the transfer function for ranges of pixel value corresponding to a uniform region. For example, determining 516 the transfer function may include implementing the technique 700 of FIG. 7 to preserve uniform regions.

It may also improve image quality to avoid introducing artifacts in the first image through a tone mapping in portions of the image that correspond to extreme levels brightness or darkness. For example, the transfer function may be set to apply unity gain at one or both of the extreme ends of the dynamic range of the pixel values. These techniques may be referred to as white protection and black protection. For example, determining 516 the transfer function may include implementing the technique 800 of FIG. 8 to portions of the first image with extreme luminance values.

The technique 500 includes applying 518 the transfer function to pixel values of the first image to produce a tone mapped image. For example, a pixel value of the first image may be multiplied by a gain of the transfer function corresponding to a bin of the dynamic range in which the pixel value of the first image occurs. The tone mapped image may include pixels whose values have been multiplied by their respective gains of the transfer function. In some implementations, the transfer function may be implemented as a look-up table that directly maps an input pixel value of the first image to an output pixel value of the tone mapped image. After applying the transfer function, the global contrast of the image may be enhanced. This may provide for an image that is more pleasing to the eye and that more fully utilizes the full dynamic range available for the image.

The technique 500 includes storing or transmitting 520 an output image based on the tone mapped image. For example, the output image may be transmitted 520 to an external device (e.g., a personal computing device) for display or storage. For example, the output image may be the same as the tone mapped image. For example, the tone mapped image may be compressed using an encoder (e.g., an MPEG encoder) to determine the output image. For example, the output image may be transmitted 520 via a communications interface (e.g., the I/O interface 332 or the wireless data interface 334). For example, the output image may be stored 520 in memory of the processing apparatus 320 or in an external memory accessed via the storage interface 336.

Figure 6:
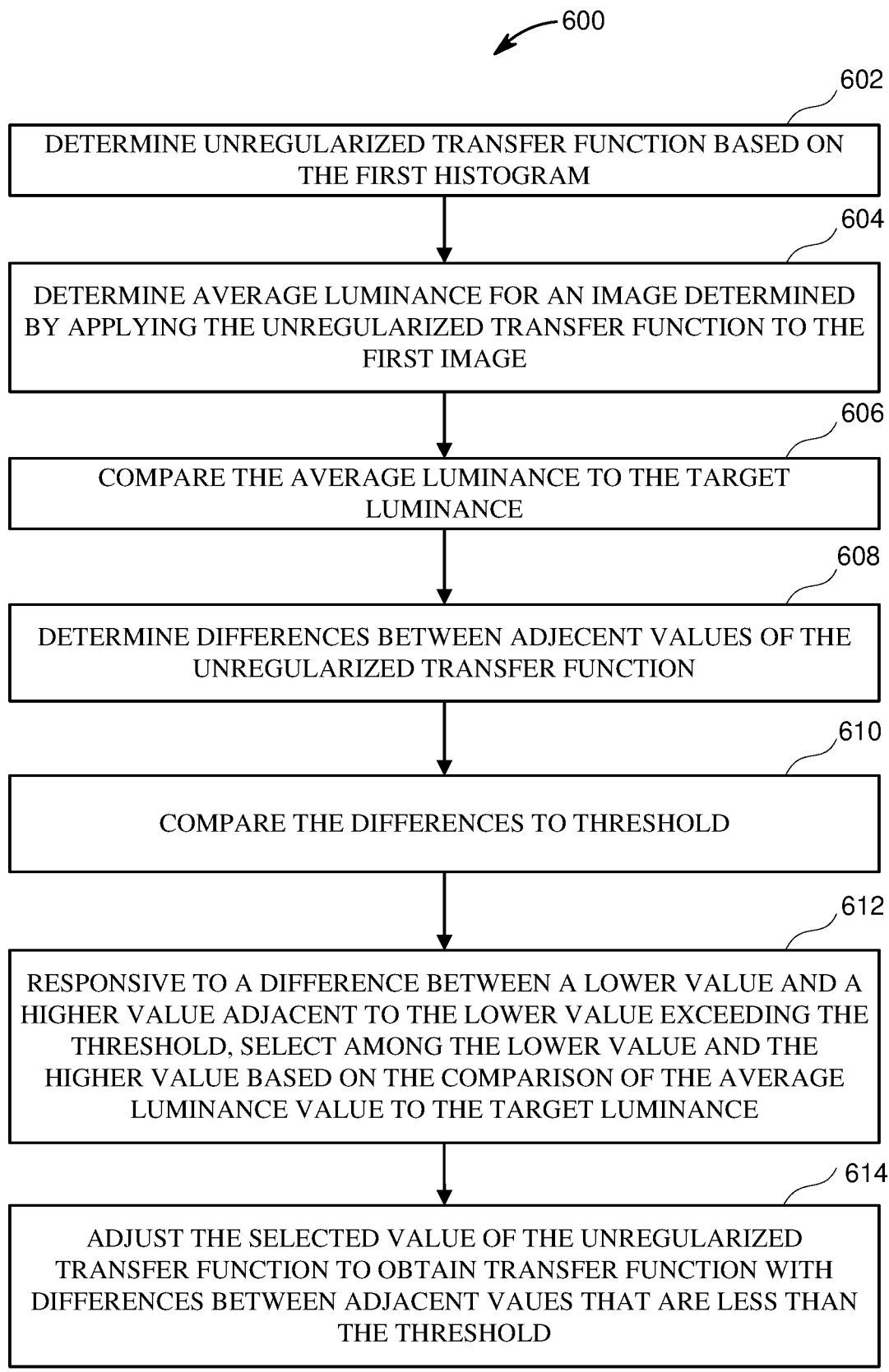
FIG. 6 is a flowchart of an example of a technique for determination of a regularized transfer function.

FIG. 6 is a flowchart of an example of a technique 600 for determination of a regularized transfer function. The technique 600 includes determining 602 an unregularized transfer function based on the first histogram and the target histogram; determining 604 an average luminance for an image determined by applying the unregularized transfer function to the first image; comparing 606 the average luminance to the target luminance; determining 608 differences between adjacent values of the unregularized transfer function; comparing 610 the differences to a threshold; responsive to a difference between a lower value and a higher value adjacent to the lower value exceeding the threshold, selecting 612 among the lower value and the higher value based on the comparison of the average luminance to the target luminance; and adjusting 614 the selected value of the unregularized transfer function to obtain the transfer function with differences between adjacent values that are less than the threshold. For example, the technique 600 may be implemented using the image capture device 100 of FIGS. 1A-B. For example, the technique 600 may be implemented using the image capture device 200 of FIGS. 2A-C. For example, the technique 600 may be implemented using the image capture device 300 of FIG. 3.

The technique 600 includes determining 602 an unregularized transfer function based on the first histogram and the target histogram. In some implementations, the unregularized transfer function is determined 602 by determining gains that will change pixel values from bins of the first histogram that are overpopulated relative to the target histogram to bins that are underpopulated relative to the target histogram. For example, the unregularized transfer function may be encoded as an array of gains or output values associated with respective bins in a partition of the dynamic range of the pixel values. In some implementations, the unregularized transfer function is determined 602 such that the application of the unregularized transfer function on the first image generates a tone mapped image that has a second histogram of luminance values within a threshold range of the target histogram.

The technique 600 includes determining 604 an average luminance for an image determined by applying the unregularized transfer function to the first image. For example, the average luminance may be estimated as an average of the pixel values of a luminance channel of the image determined by applying the unregularized transfer function to the first image. In some implementations a weighted average may be used (e.g., weighting pixels based on their distance from an optical center of the first image). In some implementations, the average luminance may be maintained as running average as the unregularized transfer function is updated by a recursive local regularization technique, by calculating a change in the average luminance caused by a change in one of the gains or values of the unregularized transfer function.

The technique 600 includes comparing 606 the average luminance to the target luminance. If the average luminance is less than the target luminance, then it may be beneficial to increase a gain or value of the transfer function at the next step of local regularization of the transfer function. If the average luminance is greater than the target luminance, then it may be beneficial to decrease a gain or value of the transfer function at the next step of local regularization of the transfer function.

The technique 600 includes determining 608 differences between adjacent values of the unregularized transfer function. These differences may provide an approximation of the derivative of the transfer function. The technique 600 for regularization may seek to force all of these differences to be within an acceptable range (e.g., between a minimum difference threshold and a maximum difference threshold). This regularization may help to avoid introducing high-frequency distortions into the first image by the tone mapping operation.

The technique 600 includes comparing 610 the differences to a threshold (e.g., a maximum difference threshold).

The technique 600 includes, responsive to a difference between a lower value and a higher value adjacent to the lower value exceeding the threshold, selecting 612 among the lower value and the higher value based on the comparison 606 of the average luminance to the target luminance. For example, if the average luminance is less than the target luminance, then the lower value of the transfer function may be selected 612 for update at the next step of local regularization of the transfer function. For example, if the average luminance is greater than the target luminance, then the higher value of the transfer function may be selected 612 for update at the next step of local regularization of the transfer function.

The technique 600 includes adjusting 614 the selected 612 value of the unregularized transfer function to obtain the transfer function with differences between adjacent values that are less than the threshold. For example, where the lower value of a pair of adjacent values was selected 612 for update, the lower value may be increased by an amount equal to a difference between the difference between the pair of adjacent values and the maximum difference threshold. For example, where the higher value of a pair of adjacent values was selected 612 for update, the lower value may be decreased by an amount equal to a difference between the difference between the pair of adjacent values and the maximum difference threshold. Note: in the discussion of steps 612 and 614, the technique 600 was described as enforcing a maximum difference between adjacent values of the transfer function, but some implementations may also enforce minimum difference between adjacent values of the transfer function.

Figure 7:
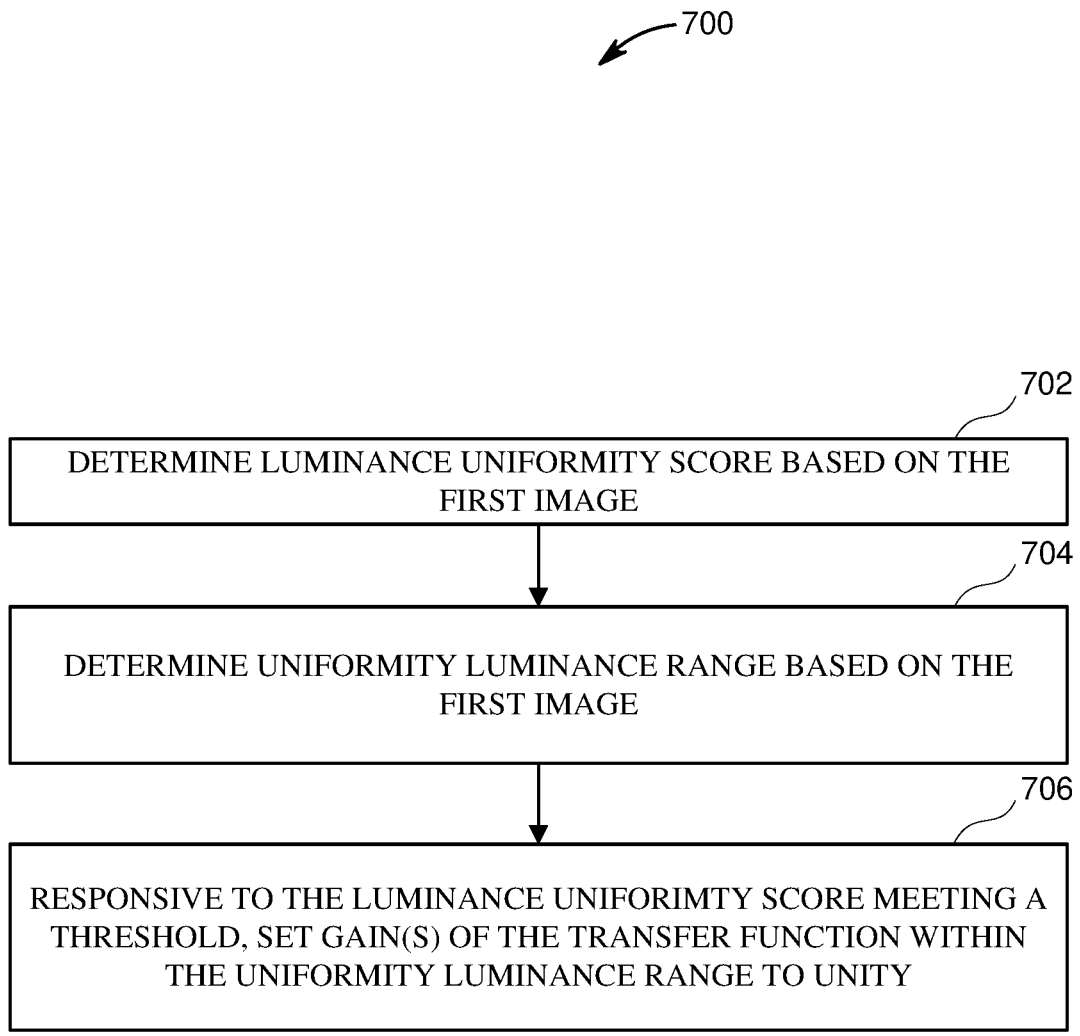
FIG. 7 is a flowchart of an example of a technique for determining a portion of a transfer function based on detected uniformity in an image.

FIG. 7 is a flowchart of an example of a technique 700 for determining a portion of a transfer function based on detected uniformity in an image. The technique 700 includes determining 702 a luminance uniformity score based on the first image; determining 704 a uniformity luminance range based on the first image; and, responsive to the luminance uniformity score meeting a threshold, setting 706 the slope of the transfer function within the uniformity luminance range to unity. For example, the technique 700 may be implemented using the image capture device 100 of FIGS. 1A-B. For example, the technique 700 may be implemented using the image capture device 200 of FIGS. 2A-C. For example, the technique 700 may be implemented using the image capture device 300 of FIG. 3.

The technique 700 includes determining 702 a luminance uniformity score based on the first image. For example, the uniformity score may be determined 702 based on a standard deviation of pixel values (e.g., luminance values) in the first image. In some implementations, a low-resolution thumbnail version of the first image is analyzed to determine the uniformity score for the first image.

The technique 700 includes determining 704 a uniformity luminance range based on the first image. For example, a subset of the bins of a partition of the dynamic range of pixel values may be identified as corresponding to a uniform portion of the first image. This subset of bins may be identified based on their proximity within the dynamic range to pixel values associated with the uniformity. For example, pixel values associated with the uniformity may be identified by analyzing the first histogram to find peaks of the histogram or modes of the distribution of pixel values.

The technique 700 includes, responsive to the luminance uniformity score meeting a threshold, setting 706 one or more gains of the transfer function within the uniformity luminance range to unity. For example, where the first image depicts a scene including a substantial amount of blue sky in the background, the uniformity score for the first image may be high enough to exceed the threshold. The pixel values corresponding to the blue sky may have many occurrences in the first image that is reflected in a spike or peak in the first histogram. One or more bins in dynamic range of pixel values at or near the peak in the first histogram may be identified as part of the uniformity luminance range. Then all pixels in the first image with values falling in the uniformity luminance range may have their slope in the transfer function set to unity (i.e., 1). This may avoid introducing noticeable distortions in the blue sky background through the tone mapping implemented with the transfer function.

Figure 8:
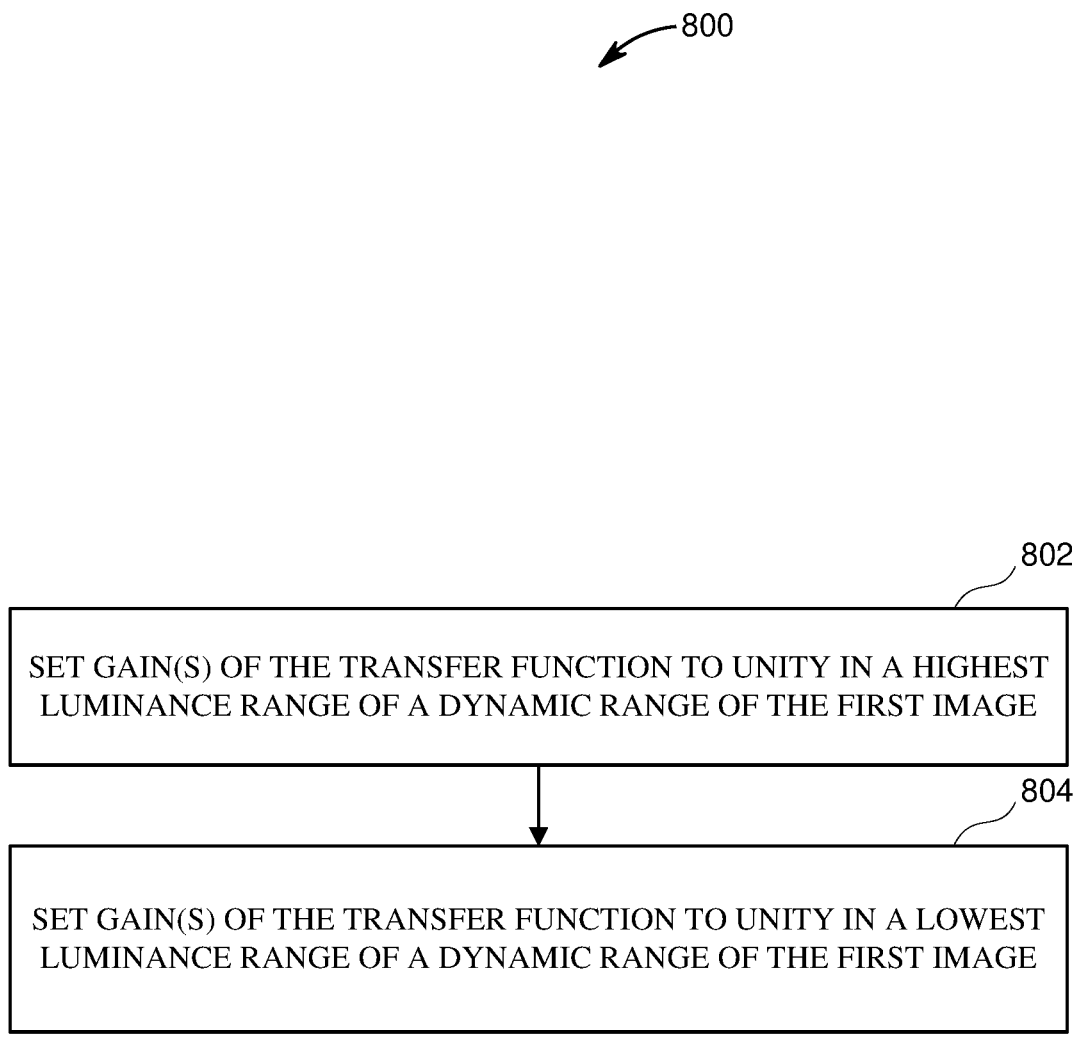
FIG. 8 is a flowchart of an example of a technique for determining a portion of a transfer function to protect white and black portions of an image.

FIG. 8 is a flowchart of an example of a technique 800 for determining a portion of a transfer function to protect white and black portions of an image. The technique 800 includes setting 802 one or more gains of the transfer function to unity in a highest luminance range of a dynamic range of the first image; and setting 804 one or more gains of the transfer function to unity in a lowest luminance range of a dynamic range of the first image. For example, the technique 800 may be implemented using the image capture device 100 of FIGS. 1A-B. For example, the technique 800 may be implemented using the image capture device 200 of FIGS. 2A-C. For example, the technique 800 may be implemented using the image capture device 300 of FIG. 3.

The technique 800 includes setting 802 one or more gains of the transfer function to unity in a highest luminance range of a dynamic range of the first image (e.g., corresponding to bright, white portions of the image). For example, highest luminance range may correspond to the highest 2% of potential luminance values of the pixels. For example, highest luminance range may correspond to the highest 1/64th of potential luminance values of the pixels in the dynamic range of the pixels. This partial determination of the transfer function may serve to protect bright, white portions of the image that are near color saturation from being distorted by the tone mapping.

The technique 800 includes setting 804 one or more gains of the transfer function to unity in a lowest luminance range of a dynamic range of the first image (e.g., corresponding to dark, black portions of the image). For example, lowest luminance range may correspond to the lowest 2% of potential luminance values of the pixels. For example, lowest luminance range may correspond to the lowest 1/64th of potential luminance values of the pixels in the dynamic range of the pixels. This partial determination of the transfer function may serve to protect dark, black portions of the image from being distorted by the tone mapping.

FIG. 9 is a flowchart of an example of a technique 900 for tone mapping for image detection. The technique 900 includes determining 901 a target luminance based on a first image detected with an image sensor and one or more capture parameters used to detect the first image; accessing 902 an unregularized transfer function; determining 904 an average luminance for an image determined by applying the unregularized transfer function to the first image; comparing 906 the average luminance to the target luminance; determining 908 differences between adjacent values of the unregularized transfer function; comparing 910 the differences to a threshold; responsive to a difference between a lower value and a higher value adjacent to the lower value exceeding the threshold, selecting 912 among the lower value and the higher value based on the comparison of the average luminance to the target luminance; adjusting 914 the selected value of the unregularized transfer function to obtain a transfer function with differences between adjacent values that are less than the threshold; and applying 916 the transfer function to pixel values of the first image to produce a tone mapped image. For example, the technique 900 may be implemented using the image capture device 100 of FIGS. 1A-B. For example, the technique 900 may be implemented using the image capture device 200 of FIGS. 2A-C. For example, the technique 900 may be implemented using the image capture device 300 of FIG. 3.

The technique 900 includes determining 901 a target luminance based on a first image detected with an image sensor and one or more capture parameters used to detect the first image. For example, determining 901 a target luminance may include accessing a first image detected using the image sensor; accessing an exposure parameter used to detect the first image; scaling pixel values of the first image by a scale factor inversely proportional to the exposure parameter to obtain a scaled image; determining a scene luminance based on an average of pixel values of the scaled image; and determining a target luminance based on the scene luminance. For example, the target luminance may be determined 901 as described in relation to steps 502 through 510 of the technique 500.

The technique 900 includes accessing 902 an unregularized transfer function. For example, the unregularized transfer function may be encoded as an array of gains or output values associated with respective bins in a partition of the dynamic range of the pixel values. For example, the unregularized transfer function may be accessed 902 from the first image sensor or from memory via a bus using a memory interface (e.g., the storage interface 336). In some implementations, the unregularized transfer function may be accessed 902 via a communications interface (e.g., the 110 interface 332 or the wireless data interface 334). For example, the unregulatized transfer function may be accessed 902 via a wireless or wired communications interface (e.g., I/O, Bluetooth, USB, HDMI, Wireless USB, Near Field Communication (NFC), Ethernet, a radio frequency transceiver, and/or other interfaces).

It may improve image quality to avoid introducing artifacts in the first image through a tone mapping in portions of the image that correspond to uniform expanses of pixels (e.g., corresponding to a blue sky or a white wall in the background of the first image). Pixels of the image corresponding to these large uniform regions may preserved by setting unity gain in the transfer function for ranges of pixel value corresponding to a uniform region. For example, determining the transfer function may include implementing the technique 700 of FIG. 7 to preserve uniform regions.

It may also improve image quality to avoid introducing artifacts in the first image through a tone mapping in portions of the image that correspond to extreme levels brightness or darkness. For example, the transfer function may be set to apply unity gain at one or both of the extreme ends of the dynamic range of the pixel values. These techniques may be referred to as white protection and black protection. For example, determining 516 the transfer function may include implementing the technique 800 of FIG. 8 to portions of the first image with extreme luminance values.

The technique 900 includes determining 904 an average luminance for an image determined by applying the unregularized transfer function to the first image. For example, the average luminance may be estimated as an average of the pixel values of a luminance channel of the image determined by applying the unregularized transfer function to the first image. In some implementations a weighted average may be used (e.g., weighting pixels based on their distance from an optical center of the first image). In some implementations, the average luminance may be maintained as a running average as the unregularized transfer function is updated by a recursive local regularization technique, by calculating a change in the average luminance caused by a change in one of the gains or values of the unregularized transfer function.

The technique 900 includes comparing 906 the average luminance to the target luminance. If the average luminance is less than the target luminance, then it may be beneficial to increase a gain or value of the transfer function at the next step of local regularization of the transfer function. If the average luminance is greater than the target luminance, then it may be beneficial to decrease a gain or value of the transfer function at the next step of local regularization of the transfer function.

The technique 900 includes determining 908 differences between adjacent values of the unregularized transfer function. These differences may provide an approximation of the derivative of the transfer function. The technique 900 for regularization may seek to force all of these differences to be within an acceptable range (e.g., between a minimum difference threshold and a maximum difference threshold). This regularization may help to avoid introducing high-frequency distortions into the first image by the tone mapping operation.

The technique 900 includes comparing 910 the differences to a threshold (e.g., a maximum difference threshold).

The technique 900 includes, responsive to a difference between a lower value and a higher value adjacent to the lower value exceeding the threshold, selecting 912 among the lower value and the higher value based on the comparison 906 of the average luminance to the target luminance. For example, if the average luminance is less than the target luminance, then the lower value of the transfer function may be selected 912 for update at the next step of local regularization of the transfer function. For example, if the average luminance is greater than the target luminance, then the higher value of the transfer function may be selected 912 for update at the next step of local regularization of the transfer function.

The technique 900 includes adjusting 914 the selected 912 value of the unregularized transfer function to obtain a transfer function with differences between adjacent values that are less than the threshold. For example, where the lower value of a pair of adjacent values was selected 912 for update, the lower value may be increased by an amount equal to a difference between the difference between the pair of adjacent values and the maximum difference threshold. For example, where the higher value of a pair of adjacent values was selected 912 for update, the higher value may be decreased by an amount equal to a difference between the difference between the pair of adjacent values and the maximum difference threshold. Note: in the discussion of steps 912 and 914, the technique 900 was described as enforcing a maximum difference between adjacent values of the transfer function, but some implementations may also enforce minimum difference between adjacent values of the transfer function.

The technique 900 includes applying 916 the transfer function to pixel values of the first image to produce a tone mapped image. For example, a pixel value of the first image may be multiplied by a gain of the transfer function corresponding to a bin of the dynamic range in which the pixel value of the first image occurs. The tone mapped image may include pixels whose values have been multiplied by their respective gains of the transfer function. In some implementations, the transfer function may be implemented as a look-up table that directly maps an input pixel value of the first image to an output pixel value of the tone mapped image. After applying the transfer function, the global contrast of the image may be enhanced. This may provide for an image that is more pleasing to the eye and that more fully utilizes the full dynamic range available for the image.

The methods and techniques of tone mapping for image capture described herein, or aspects thereof, may be implemented by an image capture apparatus, or one or more components thereof, such as the image capture apparatus 100 shown in FIGS. 1A-1B, the image capture apparatus 200 shown in FIGS. 2A-2C, or the image capture apparatus 300 shown in FIG. 3. The methods and techniques of tone mapping for image capture described herein, or aspects thereof, may be implemented by an image capture device, such as the image capture device 104 shown in FIGS. 1A-1B, one or more of the image capture devices 204, 206 shown in FIGS. 2A-2C, an image capture device of the image capture apparatus 300 shown in FIG. 3. The methods and techniques of tone mapping for image capture described herein, or aspects thereof, may be implemented by an image processing pipeline, or one or more components thereof, such as the image processing pipeline 400 shown in FIG. 4.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
an image sensor configured to detect images; and
a processing apparatus that is configured to:
  access a first image detected using the image sensor;
  access an exposure parameter used to detect the first image;
  scale pixel values of the first image by a scale factor inversely proportional to the exposure parameter to obtain a scaled image;
  determine a scene luminance based on an average of pixel values of the scaled image;
  determine a target luminance based on the scene luminance;
  determine a target histogram based on the target luminance;
  determine a first histogram of luminance values of the first image;
  determine a transfer function based on the first histogram and the target histogram; and
  apply the transfer function to pixel values of the first image to produce a tone mapped image.

2. The system of claim 1, wherein the target histogram is determined based on a Gaussian function with a mean equal to the target luminance.

3. The system of claim 1, wherein the target luminance is determined by an autoexposure module and the target histogram is determined by a global tone mapping module.

4. The system of claim 1, wherein the scale factor is inversely proportional to one or more gain parameters used to detect the first image.

5. The system of claim 1, wherein the processing apparatus is configured to:
determine an unregularized transfer function based on the first histogram and the target histogram;
determine an average luminance for an image determined by applying the unregularized transfer function to the first image;
compare the average luminance to the target luminance;
determine differences between adjacent values of the unregularized transfer function;
compare the differences to a threshold;
responsive to a difference between a lower value and a higher value adjacent to the lower value exceeding the threshold, select among the lower value and the higher value based on the comparison of the average luminance to the target luminance; and adjust the selected value of the unregularized transfer function to obtain the transfer function with differences between adjacent values that are less than the threshold.

6. The system of claim 1, wherein the processing apparatus is configured to:
   determine a luminance uniformity score based on the first image;
   determine a uniformity luminance range based on the first image; and
   responsive to the luminance uniformity score meeting a threshold, set one or more slope of the transfer function within the uniformity luminance range to unity.

7. The system of claim 1, wherein the processing apparatus is configured to:
   set one or more gains of the transfer function to unity in a highest luminance range of a dynamic range of the first image.

8. The system of claim 1, wherein the processing apparatus is configured to:
   set one or more gains of the transfer function to unity in a lowest luminance range of a dynamic range of the first image.

9. A method comprising:
   accessing a first image detected using an image sensor;
   accessing an exposure parameter used to detect the first image;
   scaling pixel values of the first image by a scale factor inversely proportional to the exposure parameter to obtain a scaled image;
   determining a scene luminance based on an average of pixel values of the scaled image;
   determining a target luminance based on the scene luminance;
   determining a target histogram based on the target luminance;
   determining a first histogram of luminance values of the first image;
   determining a transfer function based on the first histogram and the target histogram;
   applying the transfer function to pixel values of the first image to produce a tone mapped image; and
   storing or transmitting an output image based on the tone mapped image.

10. The method of claim 9, wherein the target histogram is determined based on a Gaussian function with mean equal to the target luminance.

11. The method of claim 9, wherein the target luminance is determined by an autoexposure module and the target histogram is determined by a global tone mapping module.

12. The method of claim 9, wherein the scale factor is inversely proportional to one or more gain parameters used to detect the first image.

13. The method of claim 9, wherein determining the transfer function comprises:
   determining an unregularized transfer function based on the first histogram and the target histogram;
   determining an average luminance for an image determined by applying the unregularized transfer function to the first image;
   comparing the average luminance to the target luminance;
   determining differences between adjacent values of the unregularized transfer function;
   comparing the differences to a threshold;
   responsive to a difference between a lower value and a higher value adjacent to the lower value exceeding the threshold, selecting among the lower value and the higher value based on the comparison of the average luminance to the target luminance; and
   adjusting the selected value of the unregularized transfer function to obtain the transfer function with differences between adjacent values that are less than the threshold.

14. The method of claim 9, comprising:
   determining a luminance uniformity score based on the first image;
   determining a uniformity luminance range based on the first image; and
   responsive to the luminance uniformity score meeting a threshold, setting one or more slope of the transfer function within the uniformity luminance range to unity.

15. The method of claim 9, comprising:
   setting one or more gains of the transfer function to unity in a highest luminance range of a dynamic range of the first image.

16. The method of claim 9, comprising:
   setting one or more gains of the transfer function to unity in a lowest luminance range of a dynamic range of the first image.

17. A system comprising:
   an image sensor configured to detect images; and
   a processing apparatus that is configured to:
      access a first image detected using the image sensor;
      access an exposure parameter used to detect the first image;
      scale pixel values of the first image by a scale factor inversely proportional to the exposure parameter to obtain a scaled image;
      determine a scene luminance based on an average of pixel values of the scaled image;
      determine a target luminance based on the scene luminance;
      access an unregularized transfer function;
      determine an average luminance for an image determined by applying the unregularized transfer function to the first image;
      compare the average luminance to the target luminance;
      determine differences between adjacent values of the unregularized transfer function;
      compare the differences to a threshold;
      responsive to a difference between a lower value and a higher value adjacent to the lower value exceeding the threshold, select among the lower value and the higher value based on the comparison of the average luminance to the target luminance;
      adjust the selected value of the unregularized transfer function to obtain a transfer function with differences between adjacent values that are less than the threshold; and
      apply the transfer function to pixel values of the first image to produce a tone mapped image.

18. The system of claim 17, wherein the processing apparatus is configured to:
   determine a luminance uniformity score based on the first image;
   determine a uniformity luminance range based on the first image; and
   responsive to the luminance uniformity score meeting a threshold, set one or more slope of the transfer function within the uniformity luminance range to unity.

19. The system of claim 17, wherein the processing apparatus is configured to:

set one or more gains of the transfer function to unity in a highest luminance range of a dynamic range of the first image.

20. The system of claim 17, wherein the processing apparatus is configured to:
set one or more gains of the transfer function to unity in a lowest luminance range of a dynamic range of the first image.

* * * * *